(12) United States Patent
Tanaka et al.

(10) Patent No.: US 8,452,222 B2
(45) Date of Patent: May 28, 2013

(54) IMAGE-BEARING MEMBER PROTECTING AGENT, PROTECTIVE LAYER FORMING DEVICE, IMAGE FORMING METHOD, IMAGE FORMING APPARATUS, AND PROCESS CARTRIDGE

(75) Inventors: Shinya Tanaka, Sagamihara (JP); Hiroshi Nakai, Yokohama (JP); Kunio Hasegawa, Isehara (JP); Taichi Urayama, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 491 days.

(21) Appl. No.: 12/659,517

(22) Filed: Mar. 11, 2010

(65) Prior Publication Data

US 2010/0239309 A1 Sep. 23, 2010

(30) Foreign Application Priority Data

Mar. 18, 2009 (JP) .................. 2009-066426

(51) Int. Cl.
*G03G 15/00* (2006.01)

(52) U.S. Cl.
USPC .......................................... 399/346; 399/161

(58) Field of Classification Search
USPC .................... 399/159, 161, 346, 347
See application file for complete search history.

(56) References Cited

U.S. PATENT DOCUMENTS

| | | | |
|---|---|---|---|
| 3,501,294 A | 3/1970 | Joseph | |
| 2007/0166087 A1* | 7/2007 | Yamaguchi et al. | 399/346 |
| 2008/0138132 A1 | 6/2008 | Yamashita et al. | |
| 2008/0181689 A1* | 7/2008 | Fujimori | 399/346 |
| 2009/0016769 A1* | 1/2009 | Hatakeyama et al. | 399/107 |
| 2009/0196665 A1 | 8/2009 | Tanaka et al. | |
| 2009/0279930 A1 | 11/2009 | Kabata et al. | |
| 2009/0285613 A1 | 11/2009 | Nakai et al. | |
| 2009/0290919 A1 | 11/2009 | Tanaka et al. | |
| 2009/0290920 A1 | 11/2009 | Hatakeyama et al. | |
| 2009/0304423 A1 | 12/2009 | Ozaki et al. | |
| 2009/0341101 | 12/2009 | Tanaka et al. | |

FOREIGN PATENT DOCUMENTS

| | | |
|---|---|---|
| JP | 51-22380 | 7/1976 |
| JP | 2001-305907 | 11/2001 |
| JP | 2007-065100 | 3/2007 |
| JP | 2007-293240 | 8/2007 |
| JP | 2008-310162 | 12/2008 |

* cited by examiner

*Primary Examiner* — Walter L Lindsay, Jr.
*Assistant Examiner* — Jessica L Eley
(74) *Attorney, Agent, or Firm* — Harness, Dickey & Pierce, P.L.C.

(57) ABSTRACT

An image-bearing member protecting agent including a fatty acid metal salt, and an inorganic lubricant, wherein the image-bearing member protecting agent is a solid formed by compression molding a particulate or granulated raw material containing the fatty acid metal salt and the inorganic lubricant, and applied or adhered to a surface of an image bearing member, and wherein the image-bearing member protecting agent has a front surface which is a side of the image-bearing member protecting agent to be used at the beginning, and a rear surface which is a side thereof to be left when most of the image-bearing member protecting agent is used up, and the image-bearing member protecting agent has a density decreasing from the front surface toward the rear surface.

21 Claims, 9 Drawing Sheets

IMAGE-BEARING MEMBER PROTECTING AGENT, PROTECTIVE LAYER FORMING DEVICE, IMAGE FORMING METHOD, IMAGE FORMING APPARATUS, AND PROCESS CARTRIDGE

BACKGROUND OF THE INVENTION

1. Field of the Invention

The present invention relates to an image-bearing member protecting agent, a protective layer forming device, an image forming method, an image forming apparatus and a process cartridge, and more specifically relates to an image forming apparatus, such as a copier, facsimile, printer, plotter, and complex machine provided with these multiple functions, an image-bearing member protecting agent for protecting a surface of an image bearing member of the image forming apparatus, a protective layer forming device for forming a protective layer on the surface of the image bearing member using the image-bearing member protecting agent, an image forming method using the image-bearing member protecting agent and a process cartridge used in the image forming apparatus.

2. Description of the Related Art

Conventionally, in electrophotographic image formation, a latent electrostatic image is formed on an image bearing member made from a photoconductive material, etc. and charged toner particles are attached to this latent electrostatic image so as to form a visible image. The visible image formed using the toner particles is transferred onto a transfer medium such as paper, or the like, and then fixed on the transfer medium utilizing heat, pressure, solvent gas, or the like so as to form an output image.

Methods for the image formation are broadly classified, according to methods for charging toner particles to form a visible image, into so-called two-component developing methods in which frictional charging effected by stirring and mixing toner particles and carrier particles is utilized, and so-called one-component developing methods in which toner particles are charged without using carrier particles. Further, the one-component developing methods are classified into magnetic one-component developing methods and nonmagnetic one-component developing methods, according to whether or not magnetic force is utilized to keep toner particles on a developing roller.

In image forming apparatuses, such as copiers, complex machines based upon the copiers, and the like for which high-speed processing capability and image reproducibility are required, the two-component developing methods have been employed in many cases due to demands for stable chargeability of toner particles, stable charge rising properties of the toner particles, long-term stability of image quality, and the like; whereas in compact printers, facsimiles, etc. for which space saving, cost reduction and the like are required, the one-component developing methods have been employed in many cases.

Also, nowadays in particular, colorization of output images is progressing, and demands for improvement of image quality and stabilization of image quality are increasing like never before.

For the improvement of image quality, toners have been made smaller in average particle diameter, and particles of the toners have been made rounder in shape with their angular parts removed.

Generally, in an image forming apparatus which operates in accordance with any such electrophotographic image forming method, regardless of which developing method is employed, a drum-shaped or belt-shaped image bearing member (typified by a photoconductor) is uniformly charged while being rotated, a latent image pattern is formed on the image bearing member by laser light or the like, and the latent image pattern is visualized as a toner image by a developing unit and transferred onto a transfer medium.

After the toner image has been transferred onto the transfer medium, untransferred toner components remain on the image bearing member. If such residues are directly conveyed to a region for the charging step, it often hinders the image bearing member from being uniformly charged; accordingly, in general, the toner components, etc. remaining on the image bearing member are removed by a cleaning unit in a cleaning step after the transfer step, thereby bringing the surface of the image bearing member into a clean enough state, and then charging is carried out.

Thus, the image bearing member surface is exposed to various types of physical stress and electrical stress in steps of image formation, i.e. each step of charging, developing, transferring and cleaning, and the like, and the image bearing member, charging member, and cleaning member are deteriorated with time. In attempts to solve this problem, a number of proposals for lubricants and methods of supplying lubricant components and forming films have been made thus far to reduce deterioration of the image bearing member, charging member, and cleaning member.

For example, Japanese Patent Application Publication (JP-B) No. 51-22380 proposes a method of forming a lubricant film on a photoconductor surface by supplying the photoconductor surface with a solid lubricant composed mainly of zinc stearate in order to lengthen the lifetimes of a photoconductor and a cleaning blade.

Japanese Patent Application Laid-Open (JP-A) No. 2001-305907 discloses an example of use of a lubricant coating device as a specific method of coating a solid lubricant. The lubricant supply device includes a brush roller (a brush-shaped member, supply member) configured to come into contact with the solid lubricant molded into a bar shape, and to rub the solid lubricant so as to scrape off the solid lubricant and then supply the powdered lubricant to a photoconductor belt or an intermediate transfer belt (a lubricant supplying target). The solid lubricant is held with a solid lubricant holding member, and a spring (a biasing unit) is in contact with the solid lubricant holding member. The solid lubricant is pressed against the brush roller by the biasing force of the spring. When the brush roller is rotated, the solid lubricant being in contact with the brush roller is rubbed by the brush roller and scraped off and adhered to the brush roller, and then the lubricant adhered to the brush roller is applied and adhered to the surface of the photoconductor belt or the intermediate transfer belt. Further, a lubricant leveling blade is provided in the lubricant supply device. The lubricant leveling blade presses and spreads the lubricant on the surface of the photoconductor belt or the intermediate transfer belt, so that a lubricant layer having a uniform thickness is formed on the surface of the photoconductor belt or the intermediate transfer belt.

However, in the technique disclosed in JP-A No. 2001-305907, it has a structure such that a spring is in contact with the solid lubricant so as to press the solid lubricant against the brush roller, and the spring is extended as the solid lubricant is scraped off. Thus, the pressing force is inevitably weakened. As a result, the amount of the solid lubricant scraped decreases, and accordingly the amount of the solid lubricant supplied to the photoconductor and intermediate transfer belts decreases. Therefore, the photoconductor and intermediate transfer belts cannot be sufficiently protected over time.

To solve these problems, JP-A No. 2007-293240 proposes that a plurality of moving members are provided to a member holding a solid lubricant so as to press the moving members against the member holding the solid lubricant, and a pressure is applied to the moving members by a spring member so that a certain pressure can be maintained with respect to the brush roller, even though the solid lubricant is scraped off with time.

Moreover, to solve the problem that the photoconductor and intermediate transfer belts cannot be sufficiently protected over time due to the decrease in the amount of the solid lubricant, JP-A No. 2007-65100 proposes that the hardness of the solid lubricant is altered in the direction from the front surface to the rear surface of the solid lubricant, specifically, the hardness of the front surface, which is a side of the solid lubricant to be used at the beginning, is made higher than that of the rear surface, which is a side thereof to be left when most of the image-bearing member protecting agent is used up, so that the decrease in the amount of the consumption can be prevented.

However, it has been known that the technique disclosed in JP-A No. 2007-293240 cannot prevent the solid lubricant block (lump) obtained by compression molding from decrease in consumption with time even though the applied pressure is maintained over time. This will be exemplified in Comparative Example below.

In the technique of JP-A No. 2007-65100, there is no suggestion of a specific means for attaining a solid lubricant block having different hardness between the front surface and the rear surface. That is, JP-A No. 2007-65100 discloses that a plurality of solid lubricant blocks each having different hardness are stacked, and used. However, there is no description of the means for attaining the solid lubricant blocks formed of the same materials and each having different hardness. If the hardness is varied by changing the compositions of the solid lubricant, the same quality cannot be maintained over time.

Moreover, if the solid lubricant blocks formed of the same materials and each having different hardness are stacked and used, the inflection point of the consumption of the solid lubricant is caused due to the boundaries of the blocks. In this case, the same quality cannot be also maintained over time.

On the other hand, it has been known that the fatty acid metal salts such as zinc stearate disclosed in JP-B No. 51-22380, JP-A Nos. 2001-305907, 2007-293240, and 2007-65100 may lose lubricity in early stages due to the influence of discharge performed near the image bearing member in a charging step (For example, see the paragraph [0007] in JP-A No. 2008-310162). As a result, the lubricity of the cleaning blade and the image bearing member is lost, and toner passes through the cleaning blade, forming defect images.

BRIEF SUMMARY OF THE INVENTION

The present invention is made in view of these problems and to achieve the following objects. An object of the present invention is to provide an image-bearing member protecting agent which can prevent abrasion of an image bearing member and filming on the image bearing member, smearing of a charging member, and passing-through of toner from a blade, and can maintain such effect over time.

Another object of the present invention is to provide a protective layer forming device configured to form an excellent protective layer for the image bearing member.

Another object of the present invention is to provide an image forming method and an image forming apparatus which can form high quality images in a stable manner for a long period of time.

Another object of the present invention is to provide a process cartridge which can form high quality images in a stable manner.

Means for solving the above problems and achieving the objects of the present invention is as follows.

<1> An image-bearing member protecting agent including a fatty acid metal salt, and an inorganic lubricant, wherein the image-bearing member protecting agent is a solid formed by compression molding a particulate or granulated raw material containing the fatty acid metal salt and the inorganic lubricant, and applied or adhered to a surface of an image bearing member, and wherein the image-bearing member protecting agent has a front surface which is a side of the image-bearing member protecting agent to be used at the beginning, and a rear surface which is a side thereof to be left when most of the image-bearing member protecting agent is used up, and the image-bearing member protecting agent has a density decreasing from the front surface toward the rear surface.

"An image-bearing member protecting agent is applied or adhered to a surface of an image bearing member," can be also expressed as "an image-bearing member protecting agent is supplied to an image bearing member or a surface of the image bearing member" in a broad sense.

<2> The image-bearing member protecting agent according to <1>, wherein the fatty acid metal salt is zinc stearate.

<3> The image-bearing member protecting agent according to any one of <1> to <2>, wherein the inorganic lubricant is boron nitride.

<4> A protective layer forming device including the image-bearing member protecting agent according to any one of <1> to <3>, wherein the protective layer forming device is configured to apply or adhere the image-bearing member protecting agent to a surface of an image bearing member so as to form a protective layer.

<5> The protective layer forming device according to <4>, further including a supply member configured to supply the image-bearing member protecting agent to the surface of the image bearing member.

<6> The protective layer forming device according to any one of <4> to <5>, further including a layer forming member configured to press the image-bearing member protecting agent, which has been supplied to the surface of the image bearing member, so as to form a layer.

<7> An image forming method including forming a toner image on an image bearing member so that the image bearing member bears the toner image thereon; transferring the toner image on the image bearing member to a transfer medium; and applying or adhering the image-bearing member protecting agent according to any one of <1> to <3> to a surface of the image bearing member, from which the toner image has been transferred onto the transfer medium, so as to form a protective layer.

<8> An image forming apparatus including an image bearing member configured to bear a toner image formed of a toner; a transfer unit configured to transfer the toner image on the image baring member to a transfer medium; and the protective layer forming device according to any one of <4> and <6> configured to apply or adhere an image-bearing member protecting agent to a surface of the image bearing member, from which the toner image has been transferred onto a transfer medium, so as to form a protective layer.

<9> The image forming apparatus according to <8>, further including a cleaning unit located in a downstream from the transfer unit and an upstream from the protective layer forming device, with respect to the movement direction of the image bearing member, and configured to rub against the surface of the image bearing member so as to remove the toner remaining thereon.

<10> The image forming apparatus according to any one of <8> to <9>, wherein the image bearing member contains a thermosetting resin at least in the outermost layer thereof.

<11> The image forming apparatus according to any one of <8> to <10>, the image bearing member is a photoconductor.

<12> The image forming apparatus according to any one of <8> to <11>, further including a charging unit located in contact with or close to the surface of the image bearing member.

<13> The image forming apparatus according to <12>, wherein the charging unit includes a voltage applying unit configured to apply a voltage which includes an AC component.

<14> The image forming apparatus according to any one of <8> to <13>, wherein the image bearing member is an intermediate transfer medium.

<15> The image forming apparatus according to any one of <8> to <14>, wherein the toner has a circularity SR, represented by Equation 1, in the range of 0.93 to 1.00:

Circularity SR=Circumferential length of a circle having the same area as projected particle area/Circumferential length of projected particle image  Equation 1.

<16> The image forming apparatus according to any one of <8> to <15>, wherein a ratio (D4/D1) of a mass average particle diameter D4 of the toner to a number average particle diameter D1 of the toner is in the range of 1.00 to 1.40.

<17> A process cartridge including an image bearing member configured to bear a toner image formed of a toner; and the protective layer forming device according to any one of <4> to <6> configured to apply or adhere an image-bearing member protecting agent to a surface of the image bearing member, from which the toner image has been transferred onto a transfer medium, wherein the image-bearing member and the protective layer forming device are integrally disposed.

<18> The process cartridge according to <17>, further including a cleaning unit located in an upstream from the protective layer forming device, with respect to a movement direction of the image bearing member, and configured to rub against the surface of the image bearing member so as to remove a toner remaining thereon.

<19> The process cartridge according to any one of <17> to <18>, wherein the image bearing member contains a thermosetting resin at least in the outermost layer thereof.

<20> The process cartridge according to any one of <17> to <19>, further including a charging unit located in contact with or close to the surface of the image bearing member.

<21> The process cartridge according to any one of <17> to <20>, further including a toner container, which contains a toner having a circularity SR, represented by Equation 1, in the range of 0.93 to 1.00:

Circularity SR=Circumferential length of a circle having the same area as projected particle area/Circumferential length of projected particle image  Equation 1.

<22> The process cartridge according to any one of <17> to <21>, wherein a ratio (D4/D1) of a mass average particle diameter D4 of the toner to a number average particle diameter D1 of the toner is in the range of 1.00 to 1.40.

<23> The image forming apparatus including the process cartridge according to any one of <17> and <22>.

According to these structures and the test results described in Examples, the present invention can solve the problems described above and provide an image-bearing member protecting agent, a protective layer forming device, an image forming method, an image forming apparatus, and a process cartridge, which allow to achieve the object of the present invention. The effects of the present invention obtained by each aspect are as follows.

According to <1>, from the above-described structures and the test results described in Examples, the present invention can provide an image-bearing member protecting agent capable of preventing abrasion of an image bearing member, filming on the image bearing member, smearing of a charging member and passing through of toner from a blade, and of maintaining such effect over time According to <2>, by using stearic acid as the fatty acid metal salt, better image bearing member protecting capability can be obtained. Stearic acid is one of the most inexpensive higher fatty acids; in particular, zinc salt of stearic acid is a very stable substance in hydrophobicity.

According to <3>, by using boron nitride as the inorganic lubricant, better effect of preventing the charging member from smearing can be obtained.

According to <4> to <6>, the protective layer forming device is so structured as described above that the image-bearing member protecting agent is supplied via the supply member to the image bearing member. As a result, the protecting agent can be uniformly supplied to the surface of the image bearing member, even when a soft image-bearing member protecting agent is used. Moreover, when a layer forming member, which presses the image-bearing member protecting agent so as to form a layer, is provided in the protective layer forming device, the layer forming member may also serve as the cleaning member. To surely form the protective layer, it is preferred that the residue mainly containing toner on the image bearing member be removed beforehand by the cleaning member, so as to prevent the residue from being contained in the protective layer.

According to <7> to <16>, the image forming apparatus includes the protective layer forming device having the image-bearing member protecting agent, so that the image bearing member can continuously use for a long period of time without being replaced.

Particularly, when the image bearing member contains a thermosetting resin in the outermost layer thereof, the image-bearing member protecting agent can protect the image bearing member from being deteriorated by electrical stress, and thus the image-bearing member protecting agent allow the image bearing member containing the thermosetting resin to continuously provide long durability against mechanical stress applied thereon. Thus, it is possible to increase the durability of the image bearing member to such a level that the image bearing member can be used, virtually without being replaced.

The charging unit located in contact with or close to the surface of the image bearing member is influenced by larger electrical stress because a discharge region exists extremely close to the image bearing member. However, the image forming apparatus in which a protective layer is formed on the image bearing member of the present invention can be used without exposing the image bearing member to the electrical stress.

Also, since change in the state of the surface of the image bearing member can be minimized due to the effects of the protective layer formed thereon, it is possible to perform stable cleaning for a long period of time even in the case of using toner of great circularity or toner having a small average particle diameter, in which the quality of cleaning greatly varies depending upon change in the state of the surface of the image bearing member.

According to <17> to <23>, by constituting a process cartridge using the protective layer forming device which includes the image-bearing member protecting agent, it is possible to greatly lengthen the period of time for which the process cartridge can be used without being replaced. Thus, the running cost is reduced and the amount of waste is greatly reduced.

Particularly, when the image bearing member contains a thermosetting resin at least in the outermost layer thereof, the image-bearing member protecting agent can protect the image bearing member from being deteriorated by electrical stress, and thus the image-bearing member protecting agent allow the image bearing member containing the thermosetting resin to continuously provide long durability against mechanical stress applied thereon.

Moreover, as described above, the image bearing member protecting component of the present invention contains virtually no metal component, so that the charging unit located in contact with or close to the surface of the image bearing member is not smeared with a metal oxide or the like, and thus the charging unit less changes over time. Therefore, the members constituting the process cartridge, such as the image bearing member, the charging member, or the like can easily reuse, and the amount of waste can be further reduced, thereby eventually contributing to the protection of global environment.

DETAILED DESCRIPTION OF THE INVENTION

Figure 1:
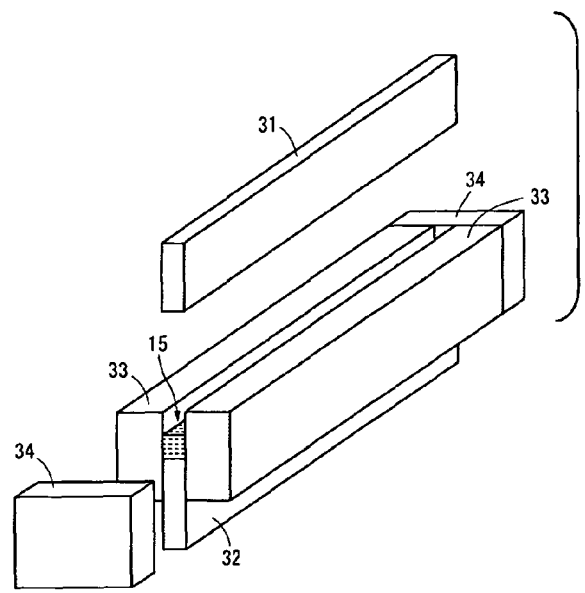
FIG. 1 is an external perspective view of an entire mold used for obtaining an image-bearing member protecting agent of an embodiment of the present invention by compression molding.

Hereinafter, an embodiment of the present invention will be described.

An image-bearing member protecting agent is preferably formed of a material which uniformly and quickly spreads over a surface of an image bearing member so as to protect the surface of the image bearing member and to impart "lubricity" to protect a cleaning blade serving as a cleaning member included in a cleaning unit. Specific examples thereof include fatty acid metal salts, inorganic lubricants, waxes, oils, and fluorine resins. Of these, a mixture of a "fatty acid metal salt" and an "inorganic lubricant" is particularly preferably used. Namely, in the present invention and its embodiments, it is essential to contain both the "fatty acid metal salt" and the "inorganic lubricant".

Examples of the fatty acid metal salt include, but not limited to, barium stearate, lead stearate, iron stearate, nickel stearate, cobalt stearate, copper stearate, strontium stearate, calcium stearate, cadmium stearate, magnesium stearate, zinc stearate, zinc oleate, magnesium oleate, iron oleate, cobalt oleate, copper oleate, lead oleate, manganese oleate, zinc palmitate, cobalt palmitate, lead palmitate, magnesium palmitate, aluminum palmitate, calcium palmitate, lead caprylate, lead caprate, zinc linolenate, cobalt linolenate, calcium linolenate, zinc ricinoleate, cadmium ricinoleate and mixtures thereof. These may be used alone or in combination.

Of these "zinc stearate" is particularly preferably used in the present invention, because it is excellent in film deposition on an image bearing member surface, which is supported by Examples described below.

However, zinc stearate has a problem in cleanability, although it is excellent in uniform film deposition. In a normal image forming process, a blade cleaning system by means of a cleaning blade is used to remove a residual toner on a photoconductor as the image bearing member, from which a toner image has been transferred. However, zinc stearate has properties to make toner more likely to pass through the cleaning blade. When the toner passes through the cleaning blade, the toner is directly printed as an image, and smearing on the charging member is further increased. The more significantly the passing-through of toner from the blade is exhibited, the smaller particle diameter the toner has. Meanwhile, since the lubricant using zinc stearate causes a large amount of the toner passing through the cleaning blade, the cleaning blade is worn, shortening the operation life of an image forming apparatus. The "inorganic lubricant" plays a role to make up for such disadvantage of zinc stearate, and is used by mixing with zinc stearate, so as to obtain a particularly excellent protective effect in the present invention.

The inorganic lubricant means a material, which itself cleaves so as to impart lubricity, or causes internal slipping. Examples thereof include, but not limited to, mica, boron nitride, molybdenum disulfide, tungsten disulfide, talc, kaolin, montmorillonite, calcium fluoride, and graphite.

Of these, "boron nitride" is particularly preferably used in the present invention, because it is supported by the description in Examples described below, and boron nitride easily cleaves and lubricates as it is formed by overlapping hexagonal lattice planes in which atoms are firmly bonded at wide intervals, whereas only weak Van der Waals' forces act between layers.

Meanwhile, the "inorganic lubricant" may be surface treated for the purpose of imparting hydrophobicity etc., as necessary.

The image-bearing member protecting agent of the present invention is a solid block (lump) shaped one which is formed by compression molding a particulate or granulated raw material containing at least the fatty acid metal salt and the inorganic lubricant in a mold. It is essential that the density of the image-bearing member protecting agent block continuously decreases from the front surface, which is a side of the image-bearing member protecting agent to be used at the beginning, toward the rear surface, which is a side thereof to be left when most of the image-bearing member protecting agent is used up.

(Method for Producing Image-Bearing Member Protecting Agent)

Hereinafter, with reference to FIGS. 1 to 9, an example of a means for attaining and method for producing the image-bearing member protecting agent of the present invention will be described.

FIG. 1 shows an entire mold used for producing the image-bearing member protecting agent of the present invention. As shown in FIG. 1, the mold used consists of one upper mold 31, one lower mold 32, two side molds 33, and two end molds 34.

The lower mold 32 is sandwiched by two side molds 33 and two end molds 34 so as to form a defined space over the lower mold 32. A raw material 15 before being compressed is loaded in the space, and pressed by means of the upper mold 31 so that the raw material 15 is compression molded to obtain a solid block shaped image-bearing member protecting agent (hereinafter, also referred to as an "image-bearing member protecting agent block") having a certain density.

Figure 8:
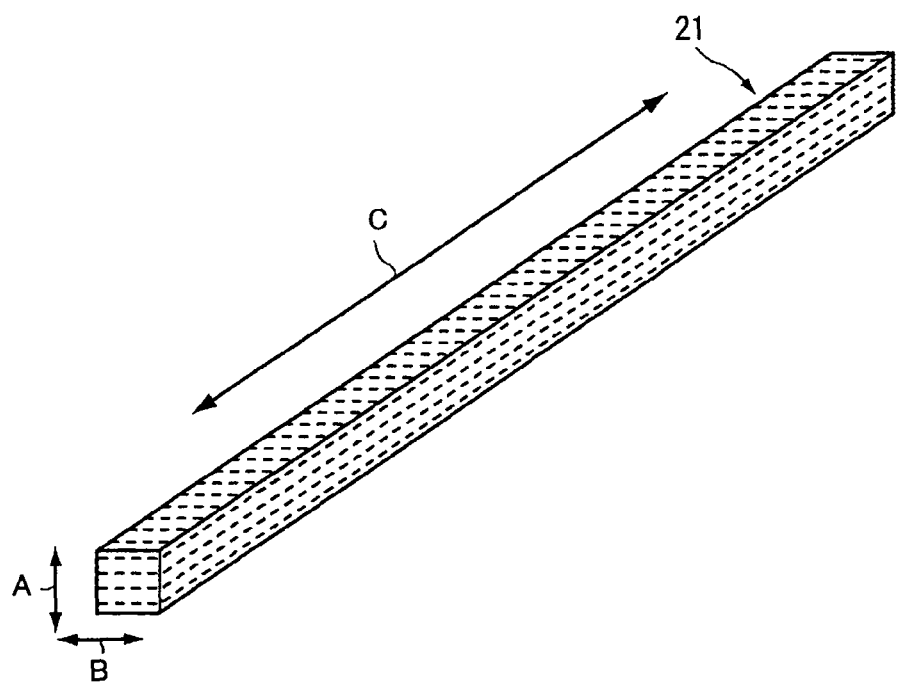
FIG. 8 is a perspective view for explaining an appearance and shape of the end product of the image-bearing member protecting agent block of the embodiment of the present invention.
Figure 9:
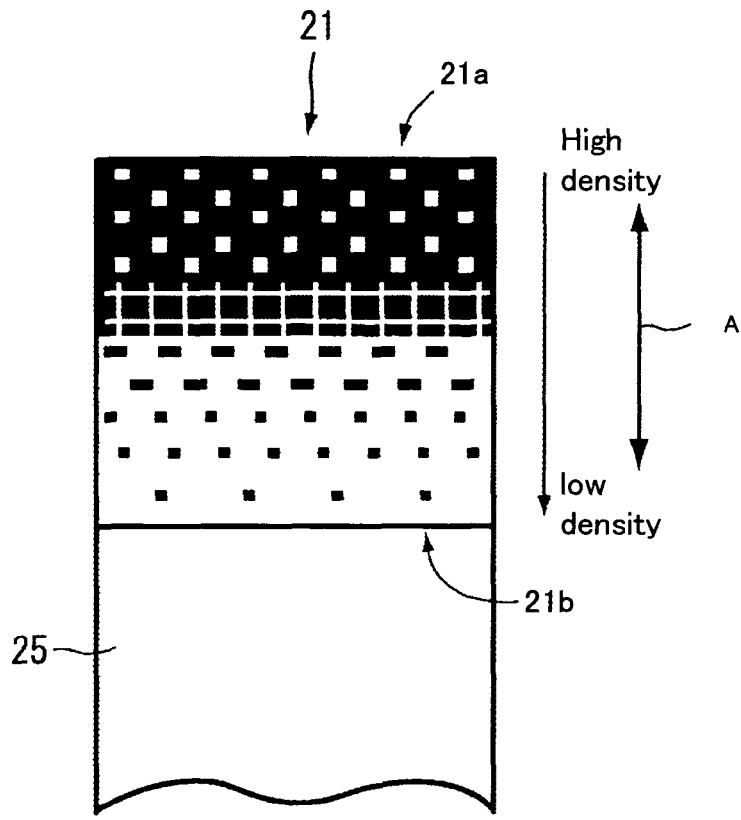
FIG. 9 is a perspective view of a main part showing a state where the end product of the image-bearing member protecting agent block, in which a density varies from the front surface toward the rear surface, is mounted in a holder of a protective layer forming device.

FIGS. 2 to 7 are cross-sectional views in which the image-bearing member protecting agent is viewed from a surface perpendicular to the longitudinal direction of the image-bearing member protecting agent. The longitudinal direction of the image-bearing member protecting agent equals to an axis and longitudinal direction of a photoconductor drum, which will be described below as one example of an image bearing member. A process and steps of producing the image-bearing member protecting agent are as shown in FIGS. 2 to 7. FIGS. 8 and 9 are schematic views of the solid block shaped image-bearing member protecting agent of the present invention, which is produced through the steps shown in FIGS. 2 to 7.

Hereinafter, the process and steps of producing the image-bearing member protecting agent block of the present invention will be schematically described. Here, the compression molding of the image-bearing member protecting agent into a certain shape, for example, a rectangular column, will be explained by using a uniaxial press molding method as a typical example of a dry molding method, which is one of powder molding methods.

Figure 2:
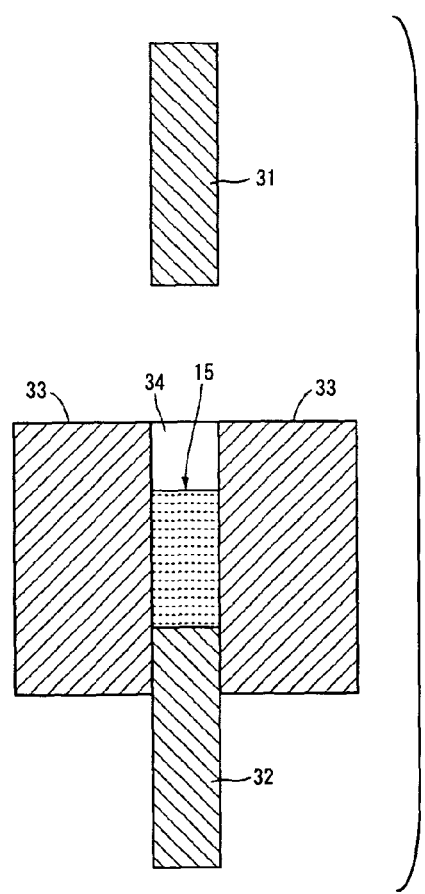
FIG. 2 is a cross-sectional view showing main parts of the mold, raw material, and the like, for explaining a process for obtaining the image-bearing member protecting agent of the embodiment of the present invention by compression molding.

Firstly, as shown in FIGS. 1 and 2, in the space formed by sandwiching the lower mold 32 with the side molds 33 and the end molds 34, the measured raw material 15 of the image-bearing member protecting agent is loaded. Here, the raw material 15 is a particulate or granulated raw material containing at least the fatty acid metal salt and the inorganic lubricant.

Figure 3:
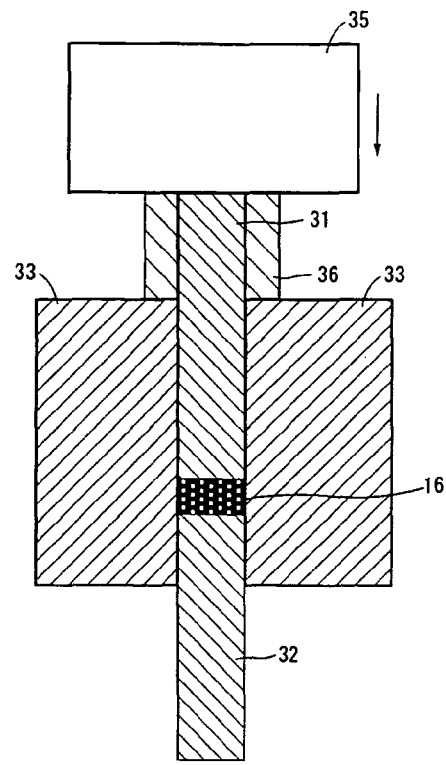
FIG. 3 is a cross-sectional view showing main parts of the compressed raw material, and the like, in the mold for explaining a process for obtaining the image-bearing member protecting agent of the embodiment of the present invention by compression molding using a press.

Next, as shown in FIG. 2 and/or FIG. 3, the upper mold 31 is placed, and the raw material 15 is compressed by pressing the upper mold 31 down using a press 35 as shown in FIG. 3. A stopper 36 is placed between the upper surfaces of the side molds 33 and the lower surface of the press 35 so as to sandwich the side walls of the upper mold 31. As a result, the image-bearing member protecting agent blocks each having a predetermined height can be molded.

Figure 4:
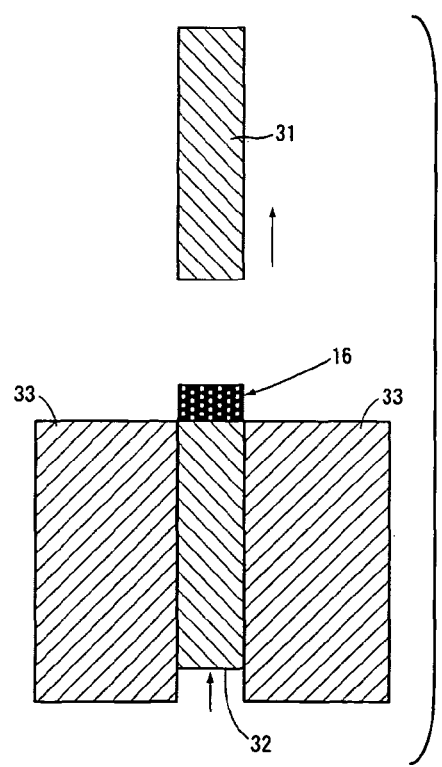
FIG. 4 is a cross-sectional view showing a main part for explaining a process of taking out an image-bearing member protecting agent block obtained by compression molding through the process shown in FIG. 3 from the mold.

Next, as shown in FIG. 4, the press 35 is released, the upper mold 31 is unfastened, the lower mold 32 is pressed up, and then the compressed image-bearing member protecting agent block 16 is taken out. In this step, a plurality of image-bearing member protecting agent blocks each having a predetermined height and different density are formed by molding.

Figure 5:
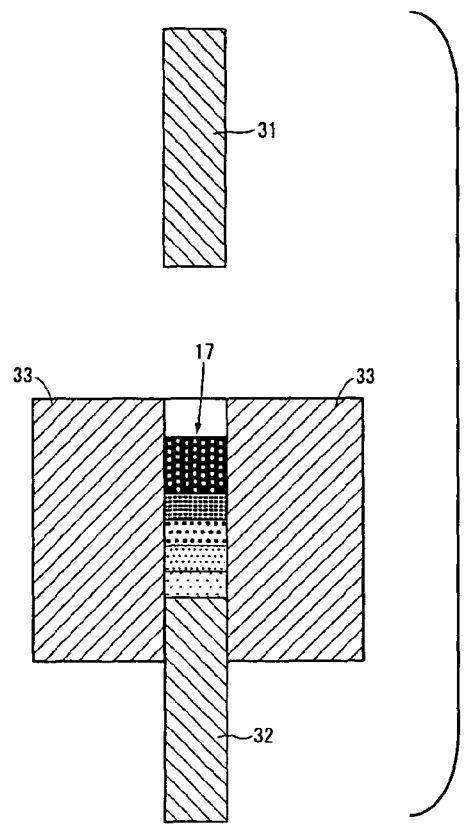
FIG. 5 is a cross-sectional view showing a main part for explaining a process of stacking a plurality of the image-bearing member protecting agent blocks each having different density, which are obtained through the process shown in FIGS. 2 to 4, in the order of the small density in the mold.

Next, as shown in FIG. 5, the plurality of image-bearing member protecting agent blocks having the same height and different densities are stacked in the order of small density from the bottom so as to form a block-stacked product 17.

Figure 6:
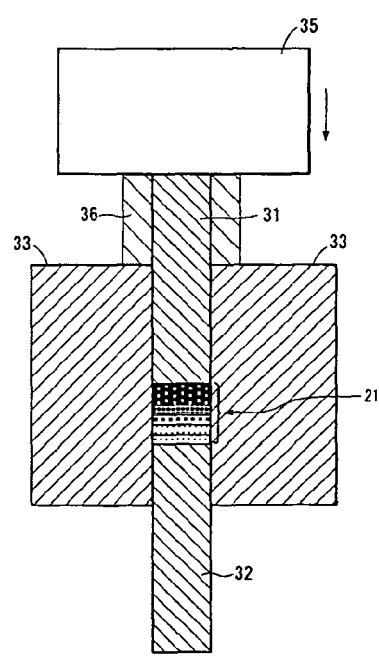
FIG. 6 is a cross-sectional view showing a main part for explaining the process in which the plurality of the image-bearing member protecting agent blocks each having different density obtained through the process of FIG. 5 are compression molded using the press, so as to obtain an end product of the image-bearing member protecting agent block.

Next, as shown in FIG. 6, the upper mold 31 is placed, and the block stacked product 17 is compressed by pressing the upper mold 31 down using the press 35. In the same manner as described with reference to FIG. 3, the stopper 36 is set so as to form the image-bearing member protecting agent block having the same height by molding. By this step, boundaries between the blocks having different densities are disappeared to thereby form an image-bearing member protecting agent block 21 having a density which continuously varies.

Figure 7:
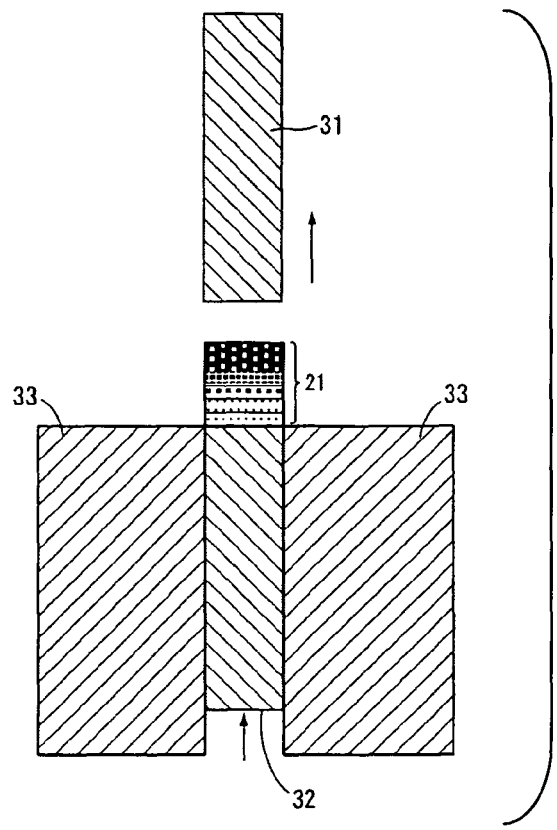
FIG. 7 is a cross-sectional view showing a main part for explaining a process of taking out the end product of the image-bearing member protecting agent block obtained through the process of FIG. 6 from the mold.

Next, as shown in FIG. 7, the press is released, the upper mold 31 is unfastened, the lower mold 32 is pressed up, and then the compressed image-bearing member protecting agent block (i.e. a solid block shaped image-bearing member protecting agent) 21 is taken out.

Thus, through the steps of FIGS. 2 to 7, the image-bearing member protecting agent (i.e. a solid block shaped image-bearing member protecting agent) 21 containing at least the fatty acid metal salt and the inorganic lubricant, and having a density continuously decreasing for the front surface which is a side of the image-bearing member protecting agent to be used at the beginning, toward the rear surface which is a side thereof to be left when most of the image-bearing member protecting agent is used up can be produced.

However, the above described steps are only exemplary steps, and the steps of producing the image-bearing member protecting agent block is not limited thereto.

FIG. 8 shows an entire appearance of the image-bearing member protecting agent block (a solid block shaped image-bearing member protecting agent) 21 produced through the steps of FIGS. 2 to 7, in which the state where the density varies in its height direction is omitted.

Figure 10:
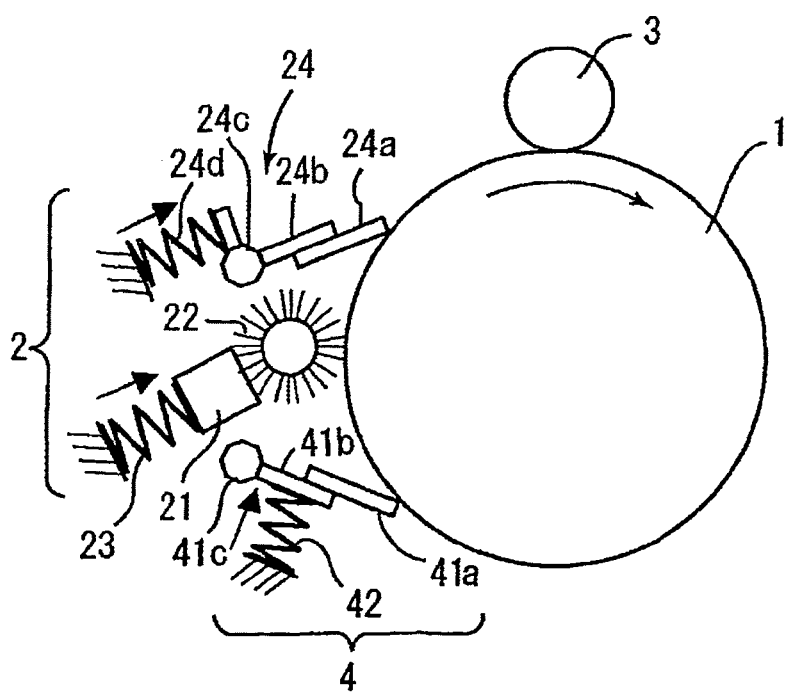
FIG. 10 is a schematic diagram showing an example of the protective layer forming device of the embodiment of the present invention.

In the case where the image-bearing member protecting agent block is used in the protective layer forming device configured to apply or adhere the image-bearing member protecting agent to the surface of the image bearing member (which will be described in FIG. 10 etc. below), the image-bearing member protecting agent block 21 is supplied to the image bearing member surface via a supply member (see FIG. 10). As shown in FIG. 9, the "front surface" 21a of the image-bearing member protecting agent block 21 means a side to be scraped off, which is used at the beginning in such a manner that the image-bearing member protecting agent block 21 is brought into contact with the supply member and then scraped off, and the "rear surface" 21b means a side which is left when most of the image-bearing member protecting agent is used up. In FIG. 9, the density of the image-bearing member protecting agent block 21 varies in the height direction. The image-bearing member protecting agent block 21 is formed in such a manner that the density continuously decreases (high to low) from the front surface which is a side of the image-bearing member protecting agent to be used at the beginning toward the rear surface. The image-bearing member protecting agent block 21 is held by adhering the rear surface thereof onto a metallic holder 25 as a holding member by means of a double sided adhesive tape, or the like.

(Protective Layer Forming Device)

With reference to FIG. 10, an embodiment of the protective layer forming device of the present invention will be described. FIG. 10 is a schematic diagram showing a structure of the protective layer forming device of the present invention.

In FIG. 10, a protective layer forming device 2 provided facing a photoconductor drum 1 as an image bearing member, mainly consist of an image-bearing member protecting agent 21, a protecting agent supply member 22 as a supply member, a pressing force applying member 23, a protective layer forming mechanism 24 as a layer forming member and the cleaning mechanism 4. The configuration of the image-bearing member protecting agent 21 in FIG. 10 is merely one example, and not limited thereto.

The protective layer forming member 24 includes a blade support 24b swingably provided around an axis 24c, a blade 24a in which one end is supported (an end opposite to the end brought into contact with the photoconductor drum 1) by the blade support 24b, and the other end is brought into contact with the surface of the photoconductor drum 1 in the trailing direction, and a spring 24d as a press unit configured to bias the blade support 24b in the clockwise direction so as to press the end of the blade 24a against the surface of the photoconductor drum 1.

The image-bearing member protecting agent 21 is the solid block shaped one formed by compression molding a particulate or granulated raw material containing at least the fatty acid metal salt and the inorganic lubricant produced through the steps of FIGS. 2 to 7. As shown in FIGS. 8 and 9, the image-bearing member protecting agent 21 is formed into a rectangular bar shape, in which the density continuously decreases from the front surface which is a side of the image-bearing member protecting agent to be used at the beginning, toward the rear surface which is a side thereof to be left when most of the image-bearing member protecting agent is used up.

The image-bearing member protecting agent 21 may be pressed by the pressing force applying mechanism 23, and brought into contact with the brush-shaped protecting agent supply member 22. The protecting agent supply member 22 rotates at a linear velocity different from that of the photoconductor drum 1 and rubs the surface of the photoconductor drum 1, so as to supply the surface of the photoconductor drum 1 as the image bearing member with the image-bearing member protecting agent 21 held on the surface of the protecting agent supply member 22.

The image-bearing member protecting agent supplied to the surface of the photoconductor drum 1 (surface of the image bearing member) may not be sufficiently formed into a protective layer upon supplying the agent due to the selection of types of materials. In order to form a more uniform protective layer, the image-bearing member protecting agent is formed into a thin layer (film) by means of the protective layer forming member 24 having a blade-shaped member, to thereby form a protective layer for the image bearing member.

The photoconductor drum 1 on which the protective layer is formed is charged in such a manner that a charging roller 3 serving as the charging unit, on which a voltage which includes an AC component is applied by a voltage applying unit (not shown), is in contact with or closely adjacent to the photoconductor drum 1 so as to discharge electricity in a minute gap between the charging roller 3 and the photoconductor drum 1.

During this process, electrical stress causes decomposition and oxidization in a part of the protective layer, and discharge products in the air may adhere onto the surface of the protective layer. The deteriorated image-bearing member protecting agent is removed together with other components such as toner particles remaining on of the photoconductor drum 1 by the cleaning mechanism 4, which is a typical cleaning unit.

The protective layer forming mechanism 24 may also be served as the cleaning mechanism 4 (hereinafter, also referred to as a cleaning unit 4). However, adequate friction requirement for the function of removing residue remaining on the surface of the image bearing member may not be the same as that for the function of forming the protective layer, thus these functions are preferably separated. As shown in FIG. 10, a cleaning unit 4 is preferably located in the upstream from the image-bearing member protecting agent supply member with respect to the movement direction (rotation direction) of the photoconductor drum 1.

The cleaning unit 4 includes a blade support 41b swingably provided around an axis 41c, a cleaning blade 41a in which one end is supported (an end opposite to the end brought into contact with the photoconductor drum 1) by the blade support 41b, and the other end is brought into contact with the surface of the photoconductor drum 1 in the counter direction, and a cleaning pressing force mechanism 42 equipped with a spring configured to bias the blade support 41b in the counterclockwise direction so as to press the end of the cleaning blade 41a against the surface of the photoconductor drum 1.

The material for the blade used in the protective layer forming mechanism 24 is not particularly limited, and known elastic materials for cleaning blades can be used. Examples thereof include a urethane rubber, hydrin rubber, silicone rubber and fluorine rubber. These may be used alone or in a blended manner. Additionally, a portion of the rubber blade, which comes into contact with the image bearing member, may be coated or impregnated with a low friction coefficient material. Further, in order to adjust the hardness of the elastic material used, fillers such as organic fillers or inorganic fillers may be dispersed in the elastic material.

The blade is fixed on a blade support 24b by any method such as adhesion or fusion bond so that a tip of the blade can be press contacted with the surface of the image bearing member. The thickness of the blade 24b cannot be unequivocally defined because the thickness is decided in view of the force applied upon pressing the blade. The thickness is preferably approximately 0.5 mm to approximately 5 mm, and more preferably approximately 1 mm to approximately 3 mm.

The length of the cleaning blade which protrudes from the blade support 24b and may bend, so-called free length, cannot also be unequivocally defined because the length is decided in view of the force applied. The length is preferably approximately 1 mm to approximately 15 mm, and more preferably approximately 2 mm to approximately 10 mm.

Another structure of the blade member (blade 24a) for forming the protective layer may be employed in which a layer of a resin, rubber, elastomer, etc. is formed over a surface of an elastic metal blade such as a spring plate, using a coupling agent, a primer component, etc. as necessary, by a method such as coating or dipping, then may be subjected to thermal curing or the like, and further subjected to surface polishing or the like, as necessary.

The thickness of the elastic metal blade is preferably approximately 0.05 mm to approximately 3 mm, and more preferably approximately 0.1 mm to approximately 1 mm.

In order to prevent the elastic metal blade from being twisted, the blade may be bent in a direction substantially parallel to a support shaft after the installation of the blade.

As the material for forming a surface layer of the blade, a fluorine resin such as PFA, PTFE, FEP or PVdF, a fluorine rubber, a silicone elastomer such as methylphenyl silicone elastomer, or the like may be used with the addition of a filler, as necessary. However, the material is not limited thereto.

The force with which the image bearing member is pressed by the protective layer forming mechanism 24 is sufficient as long as it allows the image-bearing member protecting agent to spread to be formed into a protective layer or a protective film. The force is preferably in the range of 0.05 N/cm (5 gf/cm) to 0.78 N/cm (80 gf/cm), and more preferably in the range of 0.10 N/cm (10 gf/cm) to 0.59 N/cm (60 gf/cm), in terms of a linear pressure.

A brush-shaped member is preferably used as the protecting agent supply member 22; in this case, brush fibers of the brush-shaped member preferably have flexibility to reduce mechanical stress on the surface of the image bearing member.

As the material for the flexible brush fibers, one or more resins having flexibility among those known in the art may be generally used. Examples thereof include polyolefin resins such as polyethylene and polypropylene; polyvinyl resins and polyvinylidene resins such as polystyrene, acrylic resins, polyacrylonitrile, polyvinyl acetate, polyvinyl alcohol, polyvinyl butyral, polyvinyl chloride, polyvinyl carbazole, polyvinyl ethers and polyvinyl ketones; vinyl chloride-vinyl acetate copolymers; styrene-acrylic acid copolymers; styrene-butadiene resins; fluorine resins such as polytetrafluoroethylene, polyvinyl fluoride, polyvinylidene fluoride and polychlorotrifluoroethylene; polyesters; nylons; acrylics; rayons; polyurethanes; polycarbonates; phenol resins; and amino resins such as urea-formaldehyde resins, melamine resins, benzoguanamine resins, urea resins and polyamide resins.

To adjust the extent to which the brush bends, a diene rubber, styrene-butadiene rubber (SBR), ethylene propylene rubber, isoprene rubber, nitrile rubber, urethane rubber, silicone rubber, hydrin rubber, norbornene rubber and the like may be used in combination.

A support of the protecting agent supply member 22 may be a stationary support or a roll-shaped rotatable support. The roll-shaped protecting agent supply member 22 is exemplified by a roll brush formed by spirally winding a tape made of a pile fabric formed of brush fibers around a metal core. Each brush fiber preferably has a diameter of approximately 10 μm to approximately 500 μm and a length of 1 mm to 15 mm, and a density, in which the number of the brush fibers is preferably $1.0\times10^4$ per square inch to $3.0\times10^5$ per square inch ($1.5\times10^7$ per square meter to $4.5\times10^8$ per square meter).

For the protecting agent supply member 22, use of a material having a high brush fiber density is highly desirable in terms of uniformity and stability of the supply. It is preferred that one fiber be formed from several to several hundreds of fine fibers. Specifically, 50 fine fibers of 6.7 decitex (6 denier) may be bundled together and planted as one fiber, as exemplified by the case of 333 decitex=6.7 decitex×50 filaments (300 denier=6 denier×50 filaments).

Additionally, if necessary, the brush surface may be provided with a coating layer for the purpose of stabilizing the shape of the brush surface, the environment stability, and the like. As a component of the coating layer, the component capable of deforming in conformity to the bending of the brush fibers is preferably used, and the component is not limited in any way as long as it can maintain its flexibility. Examples of the component include polyolefin resins such as polyethylene, polypropylene, chlorinated polyethylene and chlorosulfonated polyethylene; polyvinyl resins and polyvinylidene resins, such as polystyrene, acrylics (e.g. polymethyl methacrylate), polyacrylonitrile, polyvinyl acetate, polyvinyl alcohol, polyvinyl butyral, polyvinyl chloride, polyvinyl carbazole, polyvinyl ethers and polyvinyl ketones; vinyl chloride-vinyl acetate copolymers; silicone resins including organosiloxane bonds, and modified products thereof (e.g. modified products made of alkyd resins, polyester resins, epoxy resins, polyurethanes, etc.); fluorine resins such as perfluoroalkyl ethers, polyfluorovinyl, polyfluorovinylidene and polychlorotrifluoroethylene; polyamides; polyesters; polyurethanes; polycarbonates; amino resins such as urea-formaldehyde resins; epoxy resins; and combinations of these resins.

(Process Cartridge)

Figure 11:
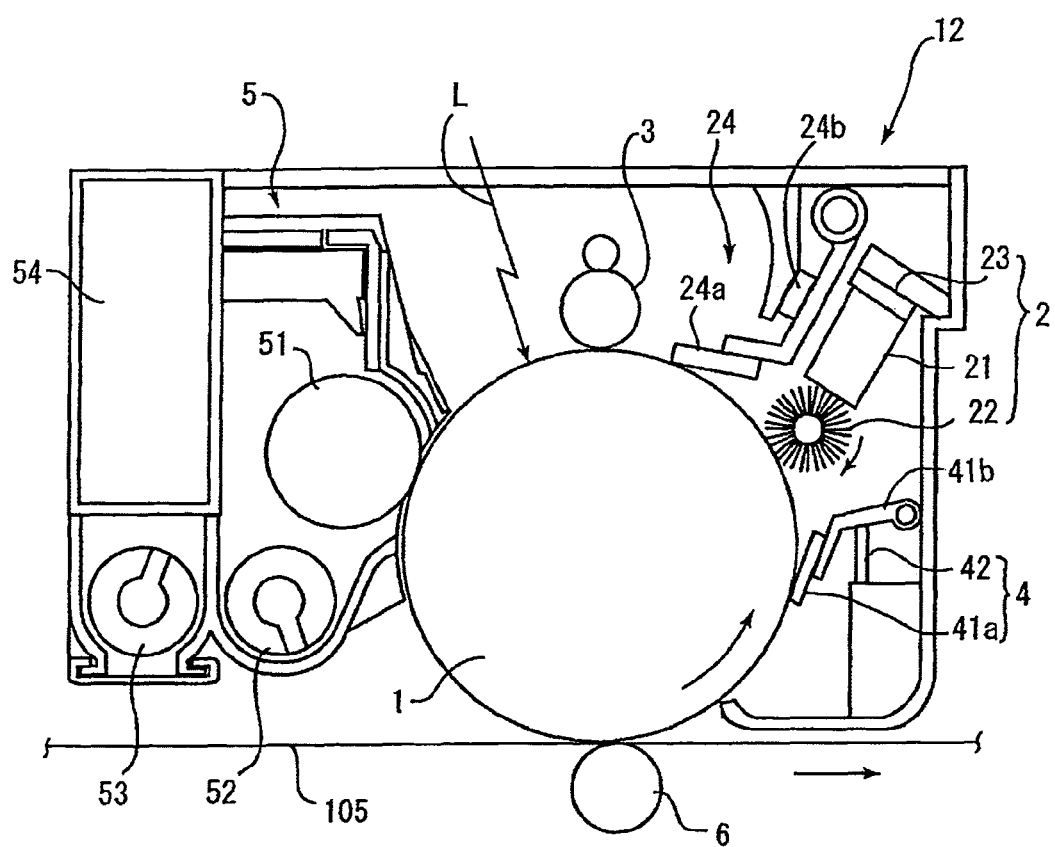
FIG. 11 is a cross-sectional view schematically showing an example of a process cartridge of the embodiment of the present invention.

An embodiment of a process cartridge of the present invention will be described with reference to FIG. 11. FIG. 11 is a cross sectional view schematically showing a configuration example of a process cartridge 12 using a protective layer forming device 2.

A process cartridge 12 integrally houses a photoconductor drum 1 as the image bearing member and the protective layer forming device 2, a charging roller 3 as the charging unit, a developing unit 5, a cleaning unit 4 and the like.

The developing device 5 includes a developing roller 51, conveying screws 52 and 53 which circulate a developer while stirring and conveying the developer, a preset case 54 which houses toner, and the like. The shapes of the protective layer forming device 2 and the cleaning unit 4 are respectively different from those shown in FIG. 10, but these are respectively denoted by the same numerals because they have the same functions.

On the surface of the photoconductor drum 1, the image-bearing member protecting agent which has been partly deteriorated after the transfer step, toner components and the like remain. The residue on the surface is cleaned using a cleaning blade 41a as the cleaning member.

In FIG. 11, the cleaning blade 41a is in contact with the surface of the photoconductor drum 1 at an angle similar to a so-called counter type (leading type).

The image-bearing member protecting agent 21 is supplied from the protecting agent supply member 22 onto the surface of the photoconductor drum 1 from which the residual toner, the degraded image-bearing member protecting agent and the like have been removed by the cleaning device 4, and a protective layer in the form of a film is formed on the surface of the photoconductor drum 1 by the protective layer forming mechanism 24. The photoconductor drum 1 on which the protective layer has been formed is charged by the charging roller 3, then a latent electrostatic image is formed on the photoconductor drum 1 by means of an exposure beam L exemplified by a laser beam. The latent electrostatic image is developed by the developing device 5 and thusly visualized into a toner image, and the toner image is transferred onto an intermediate transfer belt 105 serving as an intermediate transfer medium by a transfer roller 6 or the like serving as a transfer unit placed outside the process cartridge 12. In the case of direct transfer, the transfer medium is a sheet-like recording medium, which includes a transfer material such as a transfer paper, OHP sheet or the like.

Here, the image bearing member to which the image-bearing member protecting agent is applied or adhered is described with an example of the photoconductor drum 1. However, as the image bearing member at least one of the photoconductor and the intermediate transfer member may be used.

(Image Forming Apparatus)

Figure 12:
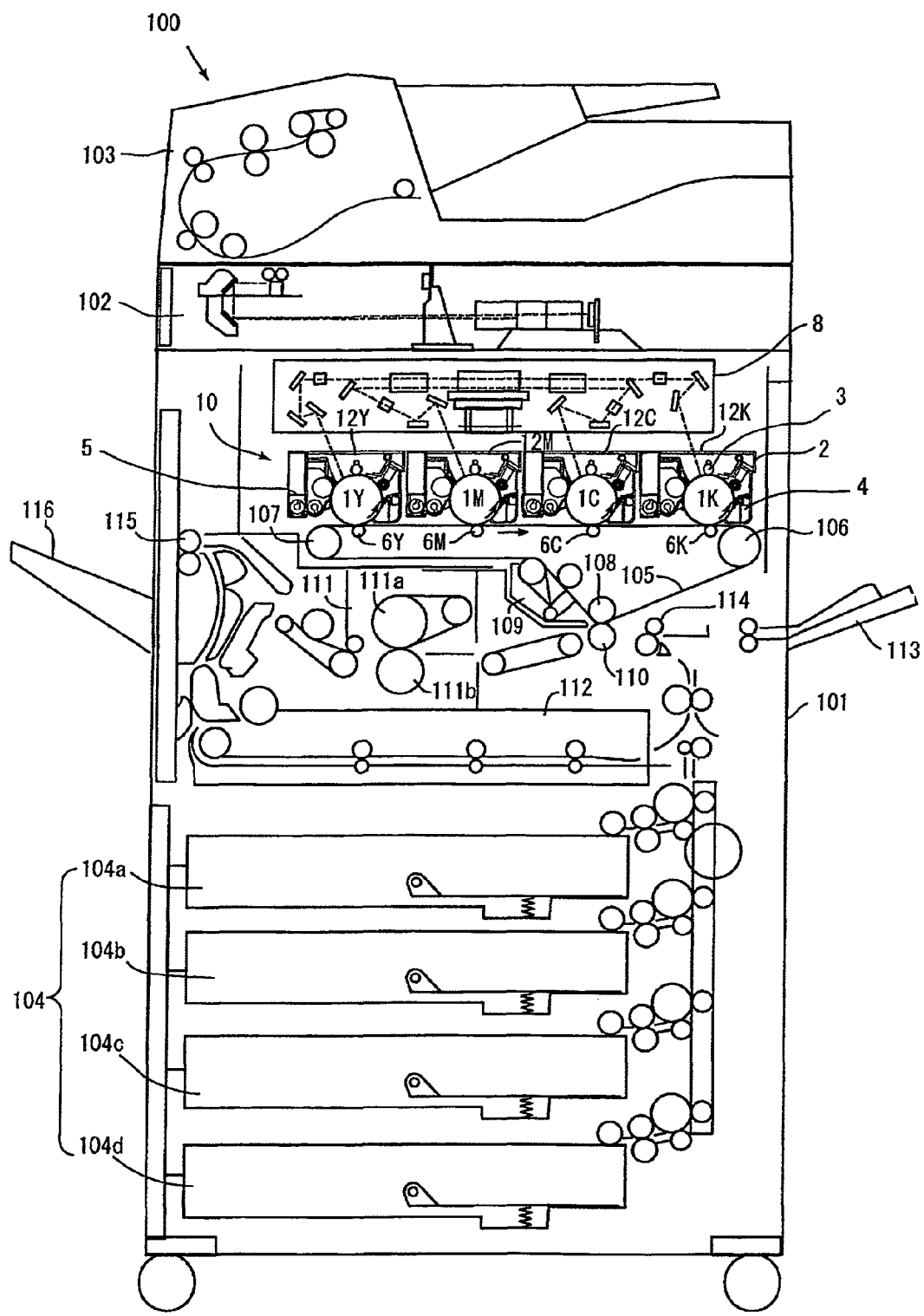
FIG. 12 is a cross-sectional view schematically showing an example of an entire color copier as an image forming apparatus of the embodiment of the present invention.

An embodiment of the image forming apparatus of the present invention will be described with reference to FIG. 12. FIG. 12 is a cross sectional view showing an example of a color copier 100 employing an image forming apparatus using a tandem intermediate transfer system having protective layer forming devices 2 and process cartridges 12.

As shown in FIG. 12, the color copier 100 includes an image forming apparatus body 101, a scanner 102 serving as a document reading device provided above the image forming apparatus body 101, and an automatic document feeder (ADF) 103 provided on the scanner 102.

A paper feed section 104 including a plurality of paper feed cassettes 104a, 104b, 104c and 104d is provided at a lower part of the image forming apparatus body 101.

An endless intermediate transfer belt 105, serving as an intermediate transfer medium or intermediate transfer member is placed at the approximate center of the image forming apparatus body 101. The intermediate transfer belt 105 is stretched around and supported by a plurality of supporting rollers 106, 107 and 108, etc. and rotationally driven in the clockwise direction in FIG. 12 by a drive source (not shown).

In the vicinity of the supporting roller 108, there is provided an intermediate transfer member cleaning device 109 to remove residual toner remaining on the intermediate transfer belt 105 after secondary transfer.

Over the intermediate transfer belt 105 stretched around the supporting rollers 106 and 107, four process cartridges 12Y, 12M, 12C and 12K as image forming units for yellow (Y), magenta (M), cyan (C) and black (K) respectively are laterally disposed in this order along its conveyance direction, thereby constituting a tandem image forming section 10. Note that the above-mentioned order in which the process cartridges for the four colors are disposed is given as an example, and they may be disposed in a different order.

In each of the process cartridges 12Y, 12M, 12C, 12K, around each of the photoconductor drum 1Y, 1M, 1C, 1K a protective layer forming device 2, a charging unit 3, a section receiving the exposure beam L from the latent electrostatic image forming unit 8, the developing unit 5, the transfer unit 6 and the cleaning unit 4, which is described with reference to FIG. 11, etc., are provided.

A latent electrostatic image forming unit 8 as the exposing unit is placed above the tandem image forming section 10. A secondary transfer roller 110 as a transfer unit is placed on the opposite side to the supporting roller 108 with respect to the intermediate transfer belt 105. A toner image on the intermediate transfer belt 105 is transferred by the secondary transfer roller 110 onto a sheet (paper) fed from the paper feed section 104.

On the left side of the secondary transfer roller 110, there is provided a fixing unit 111 to fix the transferred image on the sheet. The fixing unit 111 includes a fixing belt 111a in the form of an endless belt, and a pressurizing roller 111b pressed against the fixing belt 111a.

Below the fixing unit 111, a sheet reversing device 112 for reversing the sheet when images are formed on both surfaces of the sheet is placed substantially parallel to the above-mentioned tandem image forming section 10.

A process for image formation will be briefly described with an example of a negative-positive process, with omitting the symbols showing colors.

The photoconductor drums 1, each of which is typified by a photoconductor having an organic photoconductive layer (OPC), are subjected to charge elimination by a charge-eliminating lamp (not shown) or the like, then the photoconductor drums 1 are negatively charged in a uniform manner by charging rollers 3 as the charging units.

When each of the photoconductor drums 1 are charged by each of the charging unit 3, a voltage of appropriate intensity or a charging voltage obtained by superimposing an AC voltage onto the voltage, which is suitable for photoconductor drum 1 to a desired electric potential, is applied from a voltage applying mechanism (not shown) to the charging units (charging members) 3.

On each of the charged photoconductor drums 1, a latent electrostatic image is formed by irradiating with the laser beam from the latent electrostatic image forming unit 8 (the absolute value of the electric potential of the exposed portion is smaller than that of the electric potential of the unexposed portion).

The laser beam is emitted from a semiconductor laser, and each of the surfaces of the photoconductor drums 1 is scanned in the direction of the rotational shaft of the photoconductor drums 1, using a multifaceted mirror of a polygonal column (polygon mirror) or the like which rotates at high speed.

The thus formed latent electrostatic image is developed with a developer which contains toner particles or a mixture of toner particles and carrier particles, which is supplied onto a developing sleeve (a developing roller 51, the same as shown in FIG. 11) serving as a developer bearing member in each of the developing units 5, so as to form a visible image.

When the latent image is developed, a voltage of appropriate intensity or a developing bias obtained by superimposing an AC voltage onto the voltage is applied from a voltage applying mechanism (not shown) to a developing sleeve, with the intensity being between the intensities of the voltages for the exposed portion and the unexposed portion of each photoconductor drum 1.

Visible images corresponding to respective colors formed on photoconductor drums 1 are transferred onto the intermediate transfer belt 105 by each of transfer rollers 6 which is a part of a transfer unit (not shown), and the superimposed toner image (color image) is transferred at one time by the secondary transfer roller 110 onto a transfer medium (sheet) such as paper fed from the paper feed section 104 or from a manual bypass tray 113.

Upon transferring, an electric potential having the opposite polarity to the polarity of the toner charging is preferably applied to each of the transfer rollers 6 as a transfer bias. Then, the intermediate transfer belt 105 is separated from the photoconductor drum 1, thereby obtaining a transfer image.

Toner particles remaining on each of the photoconductor drum 1 is recovered by a cleaning blade 41a as a cleaning member to a toner recovery chamber inside the cleaning unit 4.

The sheet onto which the image has been transferred is conveyed to the fixing unit 111 where the image is fixed on the sheet by application of heat and pressure, then the sheet is ejected by a pair of paper ejecting rollers 115 and delivered and stacked on a paper delivery tray 116.

Alternatively, with its conveyance path switched by a switching claw (not shown), the sheet is conveyed to the sheet reversing device 112 where the sheet is reversed, then the sheet is again led to the transfer position so that an image is formed on the rear surface of the sheet as well, and finally the sheet is ejected by the pair of paper ejecting rollers 115 and delivered and stacked on a paper delivery tray 116.

Residual toner remaining on the intermediate transfer belt 105 after the image has been transferred onto the sheet is removed by the intermediate transfer member cleaning device 109, and a preparation for the next image formation by the tandem image forming section 10 is thus made.

The image forming apparatus is not necessarily an apparatus employing a tandem intermediate transfer method in which, as described above, a plurality of developing units are provided, a plurality of toner images of different colors that have been sequentially produced by the developing units are sequentially transferred onto an intermediate transfer medium, and subsequently these toner images are transferred onto a transfer medium such as paper at one time and then fixed thereto; the image forming apparatus may be an apparatus employing a tandem direct transfer method in which a plurality of toner images similarly produced are sequentially transferred to a transfer medium so as to superimpose toner images on top of one another, and then fixed on the transfer medium.

In the above described image forming apparatus, the charging unit 3 may employ any known configurations, but the charging unit 3 is preferably a charging unit which is located in contact with or close to the surface of the image bearing member. This makes it possible to greatly reduce the amount of ozone generated at the time of charging in comparison with corona dischargers using discharge wires, which are so-called corotron and scorotron.

However, it should be noted that in the charging unit which performs charging with the charging member located in contact with or close to the surface of the image bearing member, the image bearing member is likely to be subjected to high electrical stress, since electric discharge is performed in the vicinity of the surface of the image bearing member as described above. However, by the use of the image forming apparatus of the present invention, namely the protective layer forming device 2, utilizing the image-bearing member protecting agent 21, which is a solid block shaped image-bearing member protecting agent formed by compression molding a particulate or granulated raw material containing at least the fatty acid metal salt and the inorganic lubricant in a mold, and having a density continuously decreasing from the front surface which is a side of the image-bearing member protecting agent to be used at the beginning toward the rear surface which is a side thereof to be left when most of the image-bearing member protecting agent is used up, the process cartridge 12, and the color copier 100, the image bearing member can be maintained without causing degradation over a long period of time; hence, it is possible to greatly reduce the temporal variation in the quality of images and the variation in the quality of images caused by a use environment and thus to secure stable image quality.

Next, the photoconductor preferably used in the present invention will be described.

The photoconductor used in the image forming apparatus of the present invention includes a conductive substrate and a photosensitive layer provided on the conductive substrate. The structure of the photosensitive layer is selected from a single-layer structure in which a charge generating material and a charge transporting material are present in a mixed manner, a regular layer structure in which a charge transporting layer is provided on a charge generating layer, and an opposite layer structure in which a charge generating layer is provided on the charge transporting layer.

Additionally, a protective layer may be provided on the photosensitive layer in order to improve the mechanical strength, abrasion resistance, gas resistance, cleanability, etc. of the photoconductor. Further, an underlying layer may be provided between the photosensitive layer and the conductive substrate. Also, if necessary, an appropriate amount of a plasticizer, an antioxidant, a leveling agent, etc. may be added to each layer.

Examples of the conductive substrate include those formed by coating a film-like or cylindrical piece of plastic or paper with the material having a conductivity of $1.0 \times 10^{10}$ $\Omega \cdot cm$ or less in volume resistance, specifically a metal such as aluminum, nickel, chrome, nichrome, copper, gold, silver or platinum or a metal oxide such as tin oxide or indium oxide by means of vapor deposition or sputtering; a plate of aluminum, aluminum alloy, nickel, stainless, etc.; and a tube produced by forming the plate into a drum-shaped tube by means of drawing, extrusion, etc. and then surface-treating the tube by means of cutting, superfinishing, polishing, etc.

A drum-shaped conductive substrate preferably has a diameter of 20 mm to 150 mm, preferably 24 mm to 100 mm, and more preferably 28 mm to 70 mm. When the drum-shaped conductive substrate has a diameter of less than 20 mm, it is physically difficult to dispose, around the drum, a plurality of devices and units for charging, exposing, developing, transferring and cleaning. When the drum-shaped conductive substrate has a diameter of greater than 150 mm, it is undesirable because the size of the image forming apparatus is enlarged. Particularly, in the case where the image forming apparatus is of tandem type, it is necessary to mount a plurality of photoconductor drums therein. Thus, the diameter of the conductive substrate is preferably 70 mm or less, and more preferably 60 mm or less. The endless nickel belt and the endless stainless steel belt disclosed in JP-A No. 52-36016 may be used as the conductive substrate.

Examples of the underlying layer of the photoconductor used in the image forming apparatus of the present invention include a layer mainly composed of a resin, a layer mainly composed of a white pigment and a resin, and an oxidized metal film obtained by chemically or electrochemically oxidizing the surface of a conductive substrate; preference is given to the layer mainly composed of a white pigment and a resin. Examples of the white pigment include metal oxides such as titanium oxide, aluminum oxide, zirconium oxide and zinc oxide; of these, it is most preferable to use titanium oxide which is excellent in preventing penetration of electric charge from the conductive substrate. Examples of the resin used for the underlying layer include thermoplastic resins such as polyamide, polyvinyl alcohol, casein and methyl cellulose, and thermosetting resins such as acrylics, phenol resins, melamine resins, alkyds, unsaturated polyesters and epoxies. These may be used alone or in combination.

Examples of the charge generating material of the photoconductor used in the image forming apparatus of the present invention include azo pigments such as monoazo pigments, bisazo pigments, trisazo pigments and tetrakisazo pigments; organic pigments and dyes such as triarylmethane dyes, thiazine dyes, oxazine dyes, xanthene dyes, cyanine pigments, styryl pigments, pyrylium dyes, quinacridone pigments, indigo pigments, perylene pigments, polycyclic quinone pigments, bisbenzimidazole pigments, indanthrone pigments, squarylium pigments and phthalocyanine pigments; and inorganic materials such as selenium, selenium-arsenic, selenium-tellurium, cadmium sulfide, zinc oxide, titanium oxide and amorphous silicon. These may be used alone or in combination. The underlying layer may be a single layer or formed of a multi-layer.

Examples of the charge transporting material of the photoconductor used in the image forming apparatus of the present invention include anthracene derivatives, pyrene derivatives, carbazole derivatives, tetrazole derivatives, metallocene derivatives, phenothiazine derivatives, pyrazoline compounds, hydrazone compounds, styryl compounds, styryl hydrazone compounds, enamine compounds, butadiene compounds, distyryl compounds, oxazole compounds, oxadiazole compounds, thiazole compounds, imidazole compounds, triphenylamine derivatives, phenylenediamine derivatives, aminostilbene derivatives and triphenylmethane derivatives. These may be used alone or in combination.

Binder resins used for forming the photosensitive layer of the charge generating layer and the charge transporting layer has electrically insulating properties and may be selected from known thermoplastic resins, thermosetting resins, photocurable resins, photoconductive resins and the like. Suitable examples thereof include, but not limited to, thermoplastic resins such as polyvinyl chloride, polyvinylidene chloride, vinyl chloride-vinyl acetate copolymers, vinyl chloride-vinyl acetate-maleic anhydride copolymers, ethylene-vinyl acetate copolymers, polyvinyl butyral, polyvinyl acetal, polyesters, phenoxy resins, (meth)acrylic resins, polystyrene, polycarbonates, polyarylate, polysulphone, polyethersulphone and ABS resins; thermosetting resins such as phenol resins, epoxy resins, urethane resins, melamine resins, isocyanate resins, alkyd resins, silicone resins and thermosetting acrylic resins; and photoconductive resins such as polyvinylcarbazole, polyvinylanthracene and polyvinylpyrene. These may be used alone or in combination.

Examples of the antioxidant include the following compounds.

Monophenolic compounds include 2,6-di-t-butyl-p-cresol, butylated hydroxyanisole, 2,6-di-t-butyl-4-ethylphenol, stearyl-β-(3,5-di-t-butyl-4-hydroxyphenyl)propionate, and 3-t-butyl-4-hydroxyanisole.

Bisphenolic compounds include 2,2'-methylene-bis-(4-methyl-6-t-butylphenol), 2,2'-methylene-bis-(4-ethyl-6-t-butylphenol), 4,4'-thiobis-(3-methyl-6-t-butylphenol), and 4,4'-butylidenebis-(3-methyl-6-t-butylphenol).

Polymeric phenolic compounds include 1,1,3-tris-(2-methyl-4-hydroxy-5-t-butylphenyl)butane, 1,3,5-trimethyl-2,4, 6-tris(3,5-di-t-butyl-4-hydroxybenzyl)benzene, tetrakis-[methylene-3-(3',5'-di-t-butyl-4'-hydroxyphenyl) propionate]methane, bis[3,3'-bis(4'-hydroxy-3'-t-butylphenyl)butylic acid]glycol ester, and tocophenols.

P-phenylenediamines include N-phenyl-N' isopropyl-p-phenylenediamine, N,N'-di-sec-butyl-p-phenylenediamine, N-phenyl-N-sec-butyl-p-phenylenediamine, N,N'-di-isopropyl-p-phenylenediamine, and N,N'-dimethyl-N,N'-di-t-butyl-p-phenylenediamine.

Hydroquinones include 2,5-di-t-octylhydroquinone, 2,6-didodecylhydroquinone, 2-dodecylhydroquinone, 2-dodecyl-5-chlorohydroquinone, 2-t-octyl-5-methylhydroquinone, 2-(2-octadecenyl)-5-methylhydroquinone.

Organic sulfur compounds include dilauryl-3,3'-thiodipropionate, distearyl-3,3'-thiodipropionate, and ditetradecyl-3, 3'-thiodipropionate.

Organic phosphorus compounds include triphenylphosphine, tri(nonylphenyl)phosphine, tri(dinonylphenyl)phosphine, tricresylphosphine, and tri(2,4-dibutylphenoxy)phosphine.

As the plasticizer, a resin such as dibutyl phthalate or dioctyl phthalate generally used as a plasticizer can be used without change. It is appropriate that the amount of the plasticizer used be 0 parts by mass to 30 parts by mass relative to 100 parts by mass of the binder resin.

A leveling agent may be added into the charge transporting layer. Examples of the leveling agent include silicone oils such as dimethyl silicone oil and methylphenyl silicone oil; and polymers or oligomers having perfluoroalkyl groups in their side chains. The amount of the leveling agent used is preferably 0 parts by mass to 1 part by mass relative to 100 parts by mass of the binder resin.

As described above, a surface layer is provided in order to improve the mechanical strength, abrasion resistance, gas resistance, cleanability, etc. of the photoconductor. Examples of the material for the surface layer include a polymer, and a polymer having an inorganic filler dispersed therein, both of which have greater mechanical strength than the photosensitive layer. The polymer used for the surface layer may be a thermoplastic polymer or a thermosetting polymer, with preference being given to a thermosetting polymer because it has high mechanical strength and is highly capable of reducing abrasion caused by friction with a cleaning blade. As long as the surface layer is thin, there may be no problem if it does not have charge transporting capability; however, when a surface layer not having charge transporting capability is formed so as to be thick, the photoconductor is easily caused to decrease in sensitivity, increase in electric potential after exposure, and increase in residual potential, so that it is desirable to mix the above-mentioned charge transporting material into the surface layer or use a polymer with charge transporting capability for the surface layer. Generally, the photosensitive layer and the surface layer greatly differ from each other in mechanical strength, so that once the surface layer is abraded owing to friction with the cleaning blade and thusly disappears, the photosensitive layer is also abraded; therefore, when the surface layer is provided, it is important to make it have a sufficient thickness, the thickness being 0.01 μm to 12 μm, preferably 1 μm to 10 μm, more preferably 2 μm to 8 μm. If the thickness of the surface layer is less than 0.01 μm, it is not desirable because the surface layer is so thin that parts of the surface layer easily disappear owing to friction with the cleaning blade, and abrasion of the photosensitive layer progresses through the missing parts. If the thickness of the surface layer is greater than 12 μm, it is not desirable either because the photoconductor is easily caused to decrease in sensitivity, increase in electric potential after exposure, and increase in residual potential and, especially when a polymer with charge transporting capability is used, the cost of the polymer increases.

As the polymer used for the surface layer, a polymer which is transparent to writing light at the time of image formation and superior in insulation, mechanical strength and adhesiveness is desirable, and examples thereof include resins such as ABS resins, ACS resins, olefin-vinyl monomer copolymers, chlorinated polyethers, allyl resins, phenol resins, polyacetals, polyamides, polyamide-imides, polyacrylates, polyallylsulfones, polybutylene, polybutylene terephthalate, polycarbonates, polyethersulfones, polyethylene, polyethylene terephthalate, polyimides, acrylic resins, polymethylpentene, polypropylene, polyphenylene oxide, polysulfones, polystyrene, AS resins, butadiene-styrene copolymers, polyurethanes, polyvinyl chloride, polyvinylidene chloride and epoxy resins. The polymer exemplified by these may be a thermoplastic polymer; however, when a thermosetting polymer produced by cross-linkage with a polyfunctional cross-linking agent having an acryloyl group, carboxyl group, hydroxyl group, amino group, etc. is used as the polymer to enhance its mechanical strength, the surface layer increases in mechanical strength and it becomes possible to greatly reduce abrasion of the surface layer caused by friction with the cleaning blade.

As described above, the surface layer preferably has charge transporting capability. In order for the surface layer to have charge transporting capability, it is possible to employ a method in which a polymer used for the surface layer and the above-mentioned charge transporting material are mixed together, or a method in which a polymer having charge transporting capability is used as the surface layer, with the latter method being preferable because a photoconductor which is highly sensitive and does not increase much in electric potential after exposure or in residual potential can be obtained.

The image bearing member used in the present invention may be an intermediate transfer medium (intermediate transfer belt 105) used in image formation by a so-called intermediate transfer method in which color toner images formed on photoconductor(s) are primarily transferred so as to superimpose the color toner images on top of one another, and then transferred onto a transfer medium.

The intermediate transfer medium preferably exhibits conductivity of $10^5$ Ω·cm to $10^{11}$ Ω·cm in volume resistance. If the volume resistance is lower than $10^5$ Ω·cm, a phenomenon of so-called transfer dust may arise in which toner images become unstable owing to electric discharge, when the toner images are transferred from the photoconductors onto the intermediate transfer medium. If the volume resistance is higher than $10^{11}$ Ω·cm, opposing electric charge of a toner image may remain on the intermediate transfer medium and thus an afterimage may appear on the next image, after the toner image has been transferred from the intermediate transfer medium onto a transfer medium such as paper.

For the intermediate transfer medium, a belt-like or cylindrical plastic may, for example, be used which is produced by kneading a thermoplastic resin together with any one or combination of a metal oxide such as tin oxide or indium oxide, a conductive polymer and a conductive particle such as carbon black and then subjecting the mixture to extrusion molding. Besides, it is possible to obtain an intermediate transfer medium in the form of an endless belt by heating and centrifugally molding a resin solution containing a thermally crosslinkable monomer or oligomer, with the addition of the above-mentioned conductive particle and/or conductive polymer, if necessary.

When the intermediate transfer medium is provided with a surface layer, the materials for the surface layer of the photoconductor, excluding the charge transporting material, may be used for the surface layer after suitably subjected to resistance adjustment with the use of a conductive material.

Next, a toner suitably used in the embodiment of the present invention will be described.

The toner preferably has an average circularity of 0.93 to 1.00. The circularity is an average value of circularity SR represented by Equation 1, and indicates the degree of unevenness of a toner particle; when the toner particle is perfectly spherical, the circularity is 1.00; meanwhile, the more complex the surface shape of the toner particle becomes, the smaller the circularity becomes.

Circularity *SR*=Circumferential length of a circle having the same area as projected particle area/Circumferential length of projected particle image     Equation 1

When the average circularity is in the range of 0.93 to 1.00, the surface of toner particles is smooth, and the area where the toner particles are in contact with one another and the area where the toner particles are in contact with the photoconductor drum surface are small, so that excellent transferability can be obtained.

The toner particles do not have angles, so that the torque with which a developer is stirred in a developing unit can be reduced and the driving for stirring can be stabilized; therefore, abnormal images are not formed.

Since the toner particles which form dots do not include angular toner particles, pressure is uniformly applied to the entire toner particles when they are transferred and pressed onto a transfer medium, and thus absence of toner particles hardly occurs during the transfer.

Since the toner particles are not angular, the toner particles themselves have little abrasive power, thus not damaging or abrading the surface of the image bearing member.

Next, a method of measuring the circularity will be described.

The circularity SR can be measured using the flow-type particle image analyzer FPIA-1000 (produced by Toa Medical Electronics Co., Ltd.).

Specifically, 0.1 mL to 0.5 mL of a surfactant (preferably alkylbenzene sulfonate) is added as a dispersant into 100 mL to 150 mL of water in a container, from which solid impurities have previously been removed. Then, approximately 0.1 g to 0.5 g of a measurement sample (toner) is added. The suspension in which the sample is dispersed is subjected to dispersing treatment by an ultrasonic dispersing device for approximately 1 min to 3 min, and the concentration of the dispersed solution is adjusted such that the number of particles of the sample is 3,000 per microliter to 10,000 per microliter. Under this condition, the particle shape and particle size of the toner are measured using the analyzer.

In the present invention, the toner preferably has a mass average particle diameter D4 of 3 μm to 10 μm When the mass average particle diameter D4 is in this range, the toner includes particles which are sufficiently small in diameter with respect to fine dots of a latent image, thereby obtaining superior dot reproducibility.

When the mass average particle diameter D4 is less than 3 μm, phenomena of decrease in transfer efficiency and blade cleaning capability easily arise.

When the mass average particle diameter D4 is greater than 10 μm, it is difficult to reduce raggedness of lines and letters/characters.

The ratio (D4/D1) of the mass average particle diameter D4 of the toner to a number average particle diameter D1 of the toner is preferably in the range of 1.00 to 1.40. The closer the value of the ratio (D4/D1) is to 1, the sharper the particle size distribution of the toner is.

Thus, when the ratio (D4/D1) is in the range of 1.00 to 1.40, differences in particle diameter of the toner do not cause particles to be unevenly used for image formation, so that the image quality can be excellently stabilized.

Since the particle size distribution of the toner is sharp, the distribution of the frictional charge amount is also sharp, and thus the occurrence of fogging can be reduced.

When the toner has a uniform particle diameter, a latent image is developed such that particles are accurately and neatly arranged on dots of the latent image, and thus superior dot reproducibility can be obtained.

Next, measurement method of the particle size distribution of toner particles will be explained.

Examples of a measuring device for particle size distribution of toner particles by the coulter counter method include COULTER COUNTER TA-II and COULTER MULTISIZER II (both of which are produced by Beckman Coulter, Inc.). The measurement method will be described below.

Firstly, 0.1 mL to 5 mL of a surfactant (preferably alkylbenzene sulfonate) is added as a dispersant into 100 mL to 150 mL of an electrolytic aqueous solution. Here, the electrolytic aqueous solution is an approximately 1% NaCl aqueous solution prepared using primary sodium chloride. For the preparation, ISOTON-II (produced by Beckman Coulter, Inc.) can be used, for example. Then, 2 mg to 20 mg of a measurement sample is added. The electrolytic aqueous solution in which the sample is suspended is subjected to dispersing treatment by an ultrasonic dispersing device for approximately 1 min to 3 min, then the volume of the toner or toner particles and the number of the toner particles are measured by the measuring device, using apertures of 100 μm each, and the volume distribution and the number distribution are thus calculated. The mass average particle diameter D4 and the number average particle diameter D1 of the toner can be calculated from these distributions obtained.

As channels, the following 13 channels are used, and particles having diameters which are equal to or greater than 2.00 μm, and less than 40.30 μm are targeted: a channel of 2.00 μm or greater, and less than 2.52 μm; a channel of 2.52 μm or greater, and less than 3.17 μm; a channel of 3.17 μm or greater, and less than 4.00 μM; a channel of 4.00 μm or greater, and less than 5.04 μM; a channel of 5.04 μm or greater, and less than 6.35 μm; a channel of 6.35 μm or greater, and less than 8.00 μm; a channel of 8.00 μm or greater, and less than 10.08 μm; a channel of 10.08 μm or greater, and less than 12.70 μm; a channel of 12.70 μm or greater, and less than 16.00 μm; a channel of 16.00 μm or greater, and less than 20.20 μm; a channel of 20.20 μm or greater, and less than 25.40 μm; a channel of 25.40 μm or greater, and less than 32.00 μm; and a channel of 32.00 μm or greater, and less than 40.30 μm.

As such a substantially spherical toner, it is preferable to use a toner obtained by cross-linking and/or elongating a toner composition including a polyester prepolymer which has a nitrogen atom-containing functional group, a polyester, a colorant and a releasing agent in the presence of fine resin particles in an aqueous medium. The toner produced by the cross-linking and/or elongating reaction can reduce hot offset by hardening the toner surface and thus to prevent smears from being left on a fixing unit and appearing on images.

Examples of prepolymers made from modified polyester resins, which are used for production of the toner, include isocyanate group-containing polyester prepolymers (A). Examples of compounds which elongate and/or cross-link with the prepolymers include amines (B).

Examples of the isocyanate group-containing polyester prepolymers (A) include a compound obtained by reaction between a polyisocyanate (3) and a polyester which is a polycondensate of a polyol (1) and a polycarboxylic acid (2) and contains an active hydrogen group. Examples of the active hydrogen group of the polyester include hydroxyl groups (for example, alcoholic hydroxyl groups and phenolic hydroxyl groups), amino groups, carboxyl groups and mercapto groups, with preference being given to alcoholic hydroxyl groups.

Examples of the polyol (1) include diols (1-1) and trihydric or higher polyols (1-2), and it is preferable to use any of the diols (1-1) alone, or mixtures each composed of any of the diols (1-1) and a small amount of any of the trihydric or higher polyols (1-2). Examples of the diols (1-1) include alkylene glycols (ethylene glycol, 1,2-propylene glycol, 1,3-propylene glycol, 1,4-butanediol, 1,6-hexanediol, etc.); alkylene ether glycols (diethylene glycol, triethylene glycol, dipropylene glycol, polyethylene glycol, polypropylene glycol, polytetramethylene ether glycol, etc.); alicyclic diols (1,4-cyclohexanedimethanol, hydrogenated bisphenol A, etc.); bisphenols (bisphenol A, bisphenol F, bisphenol S, etc.); alkylene oxide (ethylene oxide, propylene oxide, butylene oxide, etc.) adducts of the alicyclic diols; and alkylene oxide (ethylene oxide, propylene oxide, butylene oxide, etc.) adducts of the bisphenols. Of these, preference is given to alkylene glycols having 2 to 12 carbon atoms, and alkylene oxide adducts of bisphenols, and greater preference is given to alkylene oxide adducts of bisphenols, and combinations of the alkylene oxide adducts of bisphenols and alkylene glycols having 2 to 12 carbon atoms. Examples of the trihydric or higher polyols (1-2) include trihydric to octahydric or higher aliphatic alcohols (glycerin, trimethylolethane, trimethylolpropane, pentaerythritol, sorbitol, etc.); trihydric or higher phenols (trisphenol PA, phenol novolac, cresol novolac, etc.); and alkylene oxide adducts of the trihydric or higher phenols.

Examples of the polycarboxylic acid (2) include dicarboxylic acids (2-1) and trivalent or higher polycarboxylic acids (2-2), and it is preferable to use any of the dicarboxylic acids (2-1) alone, or mixtures each composed of any of the dicarboxylic acids (2-1) and a small amount of any of the trivalent or higher polycarboxylic acids (2-2). Examples of the dicarboxylic acids (2-1) include alkylene dicarboxylic acids (succinic acid, adipic acid, sebacic acid, etc.); alkenylene dicarboxylic acids (maleic acid, fumaric acid, etc.); and aromatic dicarboxylic acids (phthalic acid, isophthalic acid, terephthalic acid, naphthalenedicarboxylic acid, etc.). Of these, preference is given to alkenylene dicarboxylic acids having 4 to 20 carbon atoms and aromatic dicarboxylic acids having 8 to 20 carbon atoms. Examples of the trivalent or higher polycarboxylic acids (2-2) include aromatic polycarboxylic acids (trimellitic acid, pyromellitic acid, etc.) having 9 to 20 carbon atoms. Additionally, the polycarboxylic acid (2) may be obtained by reaction between the polyol (1) and anhydrides or lower alkyl esters (methyl ester, ethyl ester, isopropyl ester, etc.) of the above-mentioned compounds.

As for the proportion of the polyol (1) to the polycarboxylic acid (2), the equivalence ratio [OH]/[COOH] of the hydroxyl group [OH] to the carboxyl group [COOH] is normally in the range of 2/1 to 1/1, preferably in the range of 1.5/1 to 1/1, more preferably in the range of 1.3/1 to 1.02/1.

Examples of the polyisocyanate (3) include aliphatic polyisocyanates (tetramethylene diisocyanate, hexamethylene diisocyanate, 2,6-diisocyanatomethyl caproate, etc.); alicyclic polyisocyanates (isophorone diisocyanate, cyclohexylmethane diisocyanate, etc.); aromatic diisocyanates (tolylene diisocyanate, diphenylmethane diisocyanate, etc.); aromatic aliphatic diisocyanates (α,α,α',α'-tetramethylxylylene diisocyanate, etc.); isocyanurates; and the polyisocyanates blocked with phenol derivatives, oximes, caprolactam, etc. These may be used alone or in combination.

As for the proportion of the polyisocyanate (3) to the polyester, the equivalence ratio [NCO]/[OH] of the isocyanate group [NCO] to the hydroxyl group [OH] of the hydroxyl group-containing polyester is normally in the range of 5/1 to 1/1, preferably in the range of 4/1 to 1.2/1, more preferably in the range of 2.5/1 to 1.5/1. When the equivalence ratio [NCO]/[OH] is greater than 5, there is a decrease in low-temperature fixing ability. When the isocyanate group [NCO] is less than 1 in molar ratio, the amount of urea contained in the modified polyester is small, adversely affecting resistance to hot offset. The amount of components of the polyisocyanate (3) contained in the isocyanate-terminated prepolymer (A) is normally 0.5% by mass to 40% by mass, preferably 1% by mass to 30% by mass, more preferably 2% by mass to 20% by mass. When the amount is less than 0.5% by mass, there is a decrease in resistance to hot offset and there is a disadvantage in satisfying both heat-resistant storage ability and low-temperature fixing ability. When the amount is greater than 40% by mass, there is a decrease in low-temperature fixing ability.

The number of isocyanate groups contained per molecule in the isocyanate group-containing prepolymer (A) is preferably 1 or more, more preferably 1.5 to 3 on average, even more preferably 1.8 to 2.5 on average. When the number of the isocyanate groups per molecule is less than 1 on average, the molecular mass of the urea-modified polyester is low, and thus there is a decrease in resistance to hot offset.

Examples of the amines (B) include diamines (B1), trivalent or higher polyamines (B2), amino alcohols (B3), amino mercaptans (B4), amino acids (B5), and compounds (B6) obtained by blocking amino groups of (B1) to (B5). Examples of the diamines (B1) include aromatic diamines such as phenylenediamine, diethyltoluenediamine, 4,4'-diaminodiphenylmethane, etc.; alicyclic diamines such as 4,4'-diamino-3,3'-dimethyldicyclohexylmethane, diaminecyclohexane, isophoronediamine, etc.; and aliphatic diamines such as ethylenediamine, tetramethylenediamine, hexamethylenediamine, etc. Examples of the trivalent or higher polyamines (B2) include diethylenetriamine and triethylenetetramine. Examples of the amino alcohols (B3) include ethanolamine and hydroxyethylaniline. Examples of the amino mercaptans (B4) include aminoethyl mercaptan and aminopropyl mercaptan. Examples of the amino acids (B5) include aminopropionic acid and aminocaproic acid. Examples of the compounds (B6) obtained by blocking amino groups of (B1) to (B5), include oxazoline compounds and ketimine compounds derived from the amines of (B1) to (B5) and ketones such as acetone, methy ethyl ketone, methyl isobutyl ketone, etc. Of these amines (B), preference is given to the diamines (B1), and mixtures each composed of any of the diamines (B1) and a small amount of any of the trivalent or higher polyamines (B2).

Further, an elongation terminator may be used so as to adjust the molecular mass of the urea-modified polyester, if necessary. Examples of the elongation terminator include monoamines such as diethylamine, dibutylamine, butylamine, laurylamine, etc., and compounds such as ketimine compounds obtained by blocking the monoamines.

As for the proportion of the amine (B), the equivalence ratio [NCO]/[NHx] of the isocyanate group [NCO] in the isocyanate group-containing prepolymer (A) to the amino group [NHx] in the amine (B) is normally in the range of 1/2 to 2/1, preferably in the range of 1.5/1 to 1/1.5, more preferably in the range of 1.2/1 to 1/1.2. When the equivalence ratio [NCO]/[NHx] is greater than 2 or less than 1/2, the molecular mass of the urea-modified polyester (i) is low, and thus there is a decrease in resistance to hot offset. In the present invention, the urea-modified polyester (i) may contain a urethane bond as well as a urea bond. The molar ratio of the amount of the urea bond to the amount of the urethane bond is normally in the range of 100/0 to 10/90, preferably in the range of 80/20 to 20/80, more preferably in the range of 60/40 to 30/70. When the urea bond is less than 10% in molar ratio, there is a decrease in resistance to hot offset.

By the above-mentioned reactions, a modified polyester, particularly the urea-modified polyester (i), used in the toner of the present invention can be produced. The urea-modified polyester (i) is produced by a one-shot method or a prepolymer method. The mass average molecular mass of the urea-modified polyester (i) is normally 10,000 or greater, preferably 20,000 to 10,000,000, more preferably 30,000 to 1,000,000. When it is less than 10,000, there is a decrease in resistance to hot offset. The number average molecular mass of the urea-modified polyester is not particularly limited when the below-mentioned unmodified polyester (ii) is additionally used; it may be such a number average molecular mass as help to obtain the above-mentioned mass average molecular mass. When the urea-modified polyester (i) is solely used, its number average molecular mass is normally 20,000 or less, preferably 1,000 to 10,000, more preferably 2,000 to 8,000. When it is greater than 20,000, there is a decrease in low-temperature fixing ability, and in the case of using in a full-color image forming apparatus, there is a decrease in glossiness.

In the present invention, instead of solely using the urea-modified polyester (i), an unmodified polyester (ii) may be additionally used as a binder resin component together with the urea-modified polyester (i). The use of the unmodified polyester (ii) together with the urea-modified polyester (i) is preferable to the use of the urea-modified polyester (i) alone because there is an increase in low-temperature fixing ability, and in the case of using in a full-color apparatus, there is an increase in glossiness. Examples of the unmodified polyester (ii) include a polycondensate of a polyol (1) and a polycarboxylic acid (2) similar to the components of the urea-modified polyester (i), and suitable examples thereof are also similar to those suitable for the urea-modified polyester (i). The polyester (ii) does not necessarily have to be an unmodified polyester and may be a polyester modified with a chemical bond other than urea bond, for example urethane bond. It is desirable in terms of low-temperature fixing ability and resistance to hot offset that the urea-modified polyester (i) and the polyester (ii) be compatible with each other at least partially. Accordingly, it is desirable that the urea-modified polyester (i) and the polyester (ii) have similar compositions. When the polyester (ii) is used, the mass ratio of the urea-modified polyester (i) to the polyester (ii) is normally in the range of 5/95 to 80/20, preferably in the range of 5/95 to 30/70, more preferably in the range of 5/95 to 25/75, particularly preferably in the range of 7/93 to 20/80. When the mass ratio of the urea-modified polyester (i) is less than 5% by mass, there is a decrease in resistance to hot offset and there is a disadvantage in satisfying both the heat-resistant storage ability and the low-temperature fixing ability.

The peak molecular mass of the polyester (ii) is normally 1,000 to 30,000, preferably 1,500 to 10,000, more preferably 2,000 to 8,000. When it is less than 1,000, there is a decrease in heat-resistant storage ability. When it is greater than 10,000, there is a decrease in low-temperature fixing ability. The hydroxyl value of the polyester (ii) is preferably 5 or greater, more preferably 10 to 120, particularly preferably 20 to 80. When the hydroxyl value is less than 5, there is a disadvantage in satisfying both the heat-resistant storage ability and the low-temperature fixing ability. The acid value of the polyester (ii) is preferably 1 to 30, more preferably 5 to 20. With such an acid value, the polyester (ii) tends to be negatively charged.

The glass transition temperature (Tg) of the binder resin is normally 50° C. to 70° C., preferably 55° C. to 65° C. When it is lower than 50° C., toner blocking worsens when the toner is stored at a high temperature. When it is higher than 70° C., the low-temperature fixing ability is insufficient. Due to the presence of the urea-modified polyester together with the binder resin, the dry toner used in the present invention tends to be superior in heat-resistant storage ability to known polyester toners even if the toner has a low glass transition point. As for the storage elastic modulus of the binder resin, the temperature (TG') at which it is 10,000 dyne/cm$^2$, at a measurement frequency of 20 Hz, is normally 100° C. or higher, preferably 110° C. to 200° C. When the temperature (TG') is lower than 100° C., there is a decrease in resistance to hot offset. As for the viscosity of the binder resin, the temperature (Tη) at which it is 1,000 P, at a measurement frequency of 20 Hz, is normally 180° C. or lower, preferably 90° C. to 160° C. When the temperature is higher than 180° C., there is a decrease in low-temperature fixing ability. Accordingly, it is desirable that TG' be higher than Tη, in terms of satisfying both low-temperature fixing ability and resistance to hot offset. In other words, the difference between TG' and Tη (TG'−Tη) is preferably 0° C. or greater, more preferably 10° C. or greater, particularly preferably 20° C. or greater. The upper limit of the difference between TG' and Tη is not particularly limited. Also, it is desirable that the difference between Tη and Tg be preferably 0° C. to 100° C., more preferably 10° C. to 90° C., particularly preferably 20° C. to 80° C., in terms of satisfying both the heat-resistant storage ability and the low-temperature fixing ability.

The binder resin is produced by the following method or the like. Firstly, the polyol (1) and the polycarboxylic acid (2) are heated at a temperature of 150° C. to 280° C. in the presence of a known esterification catalyst such as tetrabutoxy titanate or dibutyltin oxide, then water produced is distilled away, with a reduction in pressure if necessary, and a hydroxyl group-containing polyester is thus obtained. Subsequently, the polyester is reacted with the polyisocyanate (3) at a temperature of 40° C. to 140° C. so as to obtain an isocyanate group-containing prepolymer (A). Further, the prepolymer (A) is reacted with an amine (B) at a temperature of 0° C. to 140° C. so as to obtain a urea-modified polyester. When the polyester is reacted with the polyisocyanate (3) and when the prepolymer (A) is reacted with the amine (B), a solvent may be used if necessary. Examples of usable solvents include aromatic solvents such as toluene, xylene, etc.; ketones such as acetone, methyl ethyl ketone, methyl isobutyl ketone, etc.; esters such as ethyl acetate, etc.; amides such as dimethylformamide, dimethylacetamide, etc.; and ethers such as tetrahydrofuran, etc., which are inactive to the polyisocyanate (3). In the case where the polyester (ii) which is not modified with a urea bond is additionally used, the polyester (ii) is produced in a manner similar to the production of the hydroxyl group-containing polyester, and the polyester (ii) is dissolved and mixed in a solution of the above-mentioned urea-modified polyester (i) in which reaction has been finished.

Generally, the toner used in the present invention can be produced by the following method. However, other methods may be employed instead.

The aqueous medium used in the present invention may be composed solely of water or composed of water and a solvent miscible with water. Examples of the solvent miscible with water include alcohols such as methanol, isopropanol, ethylene glycol, etc.; dimethylformamide; tetrahydrofuran; cellusolves such as methyl cellusolve, etc.; and lower ketones such as acetone, methyl ethyl ketone, etc.

Toner particles may be formed in the aqueous medium by reaction between the amine (B) and a dispersion of the isocyanate group-containing prepolymer (A) or by using the urea-modified polyester (i) produced in advance. As a method for stably forming the dispersion of the prepolymer (A) and/or the urea-modified polyester (i) in an aqueous medium, there is, for example, a method of adding a toner material composition which includes the prepolymer (A) or the urea-modified polyester (i) into the aqueous medium and dispersing the composition by shearing force. The prepolymer (A) and other toner compositions (hereinafter referred to as "toner materials") such as a colorant, a colorant master batch, a releasing agent, a charge controlling agent and an unmodified polyester resin may be mixed together when the dispersion is formed in the aqueous medium; it is, however, more preferred that the toner materials be mixed together in advance, then the mixture is added and dispersed into the aqueous medium. Also in the present invention, the other toner materials such as the colorant, the releasing agent and the charge controlling agent do not necessarily have to be mixed when the particles are formed in the aqueous medium; the other toner materials may be added after the particles have been formed. For instance, particles which do not contain the colorant have been formed, and then the colorant may be added in accordance with a known dyeing method.

The dispersing method is not particularly limited, and known devices may be used in the method. Examples thereof include those using low-speed shearing dispersion, high-speed shearing dispersion, frictional dispersion, high-pressure jet dispersion and ultrasonic dispersion. The high-speed shearing dispersion is preferably used so as to form a dispersion having a particle diameter of 2 μm to 20 μm. In the case where a high-speed shearing dispersing machine is used, the rotational speed is not particularly limited, and it is normally 1,000 rpm to 30,000 rpm, preferably 5,000 rpm to 20,000 rpm. The length of time for which the dispersion lasts is not particularly limited, and it is normally 0.1 min to 5 min when a batch method is employed. The temperature for dispersion is normally 0° C. to 150° C. (under pressure), preferably 40° C. to 98° C. High temperatures are preferable in that the dispersion of the prepolymer (A) and/or the urea-modified polyester (i) has a low viscosity so as to be easily dispersed.

The amount of the aqueous medium used is normally 50 parts by mass to 2,000 parts by mass, preferably 100 parts by mass to 1,000 parts by mass, relative to 100 parts by mass of the toner composition which includes the prepolymer (A) and/or the urea-modified polyester (i). When the amount is less than 50 parts by mass, the toner composition is poorly dispersed, and thus toner particles having a predetermined diameter cannot be obtained. When the amount is greater than 2,000 parts by mass, it is not preferable from an economical point of view. Additionally, a dispersant may be used if necessary. Use of a dispersant is preferable in that the particle size distribution becomes sharper and that the dispersion can be stabilized.

As to a process of synthesizing the urea-modified polyester (i) from the prepolymer (A), the amine (B) may be added so as to be reacted therewith, before the toner composition is dispersed in the aqueous medium; alternatively, the amine (B) may be added after the toner composition has been dispersed in the aqueous medium, allowing reaction to occur from particle interfaces. In this case, the urea-modified polyester may be preferentially formed on the surface of the toner produced, and a concentration gradient may be thus provided inside toner particles.

Examples of a dispersant for emulsifying or dispersing in a water-containing liquid an oily phase in which a toner composition is dispersed include anionic surfactants such as alkylbenzene sulfonates, α-olefin sulfonates and phosphoric acid esters; amine salt-based cationic surfactants such as alkylamine salts, aminoalcohol fatty acid derivatives, polyamine fatty acid derivatives and imidazoline; quaternary ammonium salt-based cationic surfactants such as alkyltrimethyl ammonium salts, dialkyl dimethyl ammonium salts, alkyl dimethyl benzyl ammonium salts, pyridinium salts, alkyl isoquinolinium salts and benzetonium chloride; nonionic surfactants such as fatty acid amide derivatives and polyhydric alcohol derivatives; and amphoteric surfactants such as alanine, dodecyldi(aminoethyl)glycine, di(octylaminoethyl)glycine and N-alkyl-N,N-dimethylammoniumbetaine.

Use of a fluoroalkyl group-containing surfactant makes it possible to produce its effects even when used in very small amounts. Suitable examples of fluoroalkyl group-containing anionic surfactants include fluoroalkyl carboxylic acids having 2 to 10 carbon atoms, and metal salts thereof, disodium perfluorooctanesulfonylglutamate, sodium 3-[Ω-fluoroalkyl (C6 to C11) oxy]-1-alkyl (C3 to C4) sulfonate, sodium 3-[ω-fluoroalkanoyl (C6 to C8)-N-ethylamino]-1-propanesulfonate, fluoroalkyl (C11 to C20) carboxylic acids and metal salts thereof, perfluoroalkylcarboxylic acids (C7 to C13) and metal salts thereof, perfluoroalkyl (C4 to C12) sulfonic acids and metal salts thereof, perfluorooctanesulfonic acid diethanolamide, N-propyl-N-(2-hydroxyethyl) perfluorooctanesulfonamide, perfluoroalkyl (C6 to C10) sulfonamide propyltrimethylammonium salts, perfluoroalkyl (C6 to C10)-N-ethylsulfonylglycine salts and monoperfluoroalkyl (C6 to C16) ethyl phosphoric acid esters.

Examples of commercially available products of the fluoroalkyl group-containing surfactants include SURFLON S-111, S-112 and S-113 (produced by Asahi Glass Co., Ltd.); FLUORAD FC-93, FC-95, FC-98 and FC-129 (produced by Sumitomo 3M Limited); UNIDYNE DS-101 and DS-102 (produced by DAIKIN INDUSTRIES, LTD.); MEGAFACE F-110, F-120, F-113, F-191, F-812 and F-833 (produced by Dainippon Ink And Chemicals, Incorporated); EFTOP EF-102, 103, 104, 105, 112, 123A, 123B, 306A, 501, 201 and 204 (produced by Tochem Products Co., Ltd.); and FTERGENT F-100 and F150 (produced by NEOS COMPANY LIMITED).

Examples of cationic surfactants include fluoroalkyl group-containing aliphatic primary, secondary or tertiary amine acids, aliphatic quaternary ammonium salts such as perfluoroalkyl (C6 to C10) sulfonamide propyltrimethylammonium salts, benzalkonium salts, benzetonium chloride, pyridinium salts and imidazolinium salts. Examples of cationic surfactants as products include SURFLON S-121 (produced by Asahi Glass Co., Ltd.), FLUORAD FC-135 (produced by Sumitomo 3M Limited), UNIDYNE DS-202 (produced by DAIKIN INDUSTRIES, LTD.), MEGAFACE F-150 and F-824 (produced by Dainippon Ink And Chemicals, Incorporated), EFTOP EF-132 (produced by Tochem Products Co., Ltd.), and FTERGENT F-300 (produced by NEOS COMPANY LIMITED).

Also, as inorganic compound dispersants sparingly soluble in water, tricalcium phosphate, calcium carbonate, titanium oxide, colloidal silica, hydroxyappetite and the like may be used.

A polymeric protective colloid may be added to stabilize dispersion droplets. Examples thereof include acids such as acrylic acid, methacrylic acid, α-cyanoacrylic acid, α-cyanomethacrylic acid, itaconic acid, crotonic acid, fumaric acid, maleic acid and maleic anhydride; hydroxyl group-containing (meth)acrylic monomers such as acrylic acid β-hydroxyethyl, methacrylic acid β-hydroxyethyl, acrylic acid β-hydroxypropyl, methacrylic acid β-hydroxypropyl, acrylic acid γ-hydroxypropyl, methacrylic acid γ-hydroxypropyl, acrylic acid-3-chloro-2-hydroxypropyl, methacrylic acid-3-chloro-2-hydroxypropyl, diethyleneglycolmonoacrylic acid esters, diethyleneglycolmonomethacrylic acid esters, glycerinmonoacrylic acid esters, glycerinmonomethacrylic acid esters, N-methylolacrylamide and N-methylolmethacrylamide; vinyl alcohol and ethers of vinyl alcohol such as vinyl methyl ether, vinyl ethyl ether and vinyl propyl ether; esters of carboxyl group-containing compounds and vinyl alcohol such as vinyl acetate, vinyl propionate and vinyl butyrate; acrylamide, methacrylamide, diacetone acrylamide, and methylol compounds thereof; acid chlorides such as acrylic acid chloride and methacrylic acid chloride; homopolymers and copolymers of nitrogen-containing compounds such as vinyl pyridine, vinyl pyrrolidone, vinyl imidazole and ethyleneimine, and of these nitrogen-containing compounds each having a heterocyclic ring; polyoxyethylene-based compounds such as polyoxyethylene, polyoxypropylene, polyoxyethylene alkylamine, polyoxypropylene alkylamine, polyoxyethylene alkylamide, polyoxypropylene alkylamide, polyoxyethylene nonyl phenyl ether, polyoxyethylene lauryl phenyl ether, polyoxyethylene stearyl phenyl ester and polyoxyethylene nonyl phenyl ester; and celluloses such as methyl cellulose, hydroxyethyl cellulose and hydroxypropyl cellulose.

In the case where a substance soluble in acid and/or alkali, such as a calcium phosphate salt, is used as a dispersion stabilizer, the substance is dissolved in an acid, e.g. hydrochloric acid, then the substance is removed from fine particles, for example by washing with water. Besides, its removal is enabled by a process such as decomposition brought about by an enzyme.

In the case where the dispersant is used, the dispersant may remain on the toner particle surface; it is, however, preferable in terms of toner chargeability to remove the dispersant by washing after elongation and/or cross-linkage.

Further, to reduce the viscosity of the toner composition, a solvent may be used in which the urea-modified polyester (i) and/or the prepolymer (A) are/is soluble. Use of the solvent is preferable in that the particle size distribution becomes sharper. The solvent is preferably volatile in terms of easy removal. Examples of the solvent include toluene, xylene, benzene, carbon tetrachloride, methylene chloride, 1,2-dichloroethane, 1,1,2-trichloroethane, trichloroethylene, chloroform, monochloro benzene, dichloroethylidene, methyl acetate, ethyl acetate, methyl ethyl ketone and methyl isobutyl ketone. These may be used alone or in combination. Of these, aromatic solvents such as toluene and xylene, and halogenated hydrocarbons such as methylene chloride, 1,2-dichloroethane, chloroform and carbon tetrachloride are preferable, aromatic solvents such as toluene and xylene are more preferable. The amount of the solvent used is normally 0 parts by mass to 300 parts by mass, preferably 0 parts by mass to 100 parts by mass, more preferably 25 parts by mass to 70 parts by mass, relative to 100 parts by mass of the prepolymer (A). In the case where the solvent is used, it is removed by heating under normal or reduced pressure after elongation and/or cross-linkage.

The length of time for which the elongation and/or the cross-linkage lasts is selected according to the reactivity between the isocyanate group structure of the prepolymer (A) and the amine (B) and is normally in the range of 10 min to 40 hr, preferably in the range of 2 hr to 24 hr. The reaction temperature is normally in the range of 0° C. to 150° C., preferably in the range of 40° C. to 98° C. Additionally, a known catalyst may be used if necessary. Specific examples thereof include dibutyltin laurate and dioctyltin laurate.

To remove an organic solvent from the obtained emulsified dispersion, a method can be employed in which the entire system is gradually increased in temperature and the organic solvent in droplets is completely removed by evaporation. Alternatively, by spraying the emulsified dispersion into a dry atmosphere and completely removing a water-insoluble organic solvent in droplets, fine toner particles can be formed, and also, an aqueous dispersant can be removed by evaporation. Generally, examples of the dry atmosphere into which the emulsified dispersion is sprayed include gases such as air, nitrogen, carbon dioxide gas and combustion gas which have been heated, especially flow of gasses heated to a temperature higher than or equal to the boiling point of the solvent used that has the highest boiling point. A dry atmosphere of highly desired quality can be obtained by a short-time process with a spray dryer, a belt dryer, a rotary kiln or the like.

In the case where the dispersion has a wide particle size distribution at the time of emulsification and dispersion, and washing and drying processes are carried out with the particle size distribution kept unchanged, it is possible to adjust the particle size distribution such that particles are classified according to a desired particle size distribution.

As to the classification, fine particles can be removed by a cyclone separator, a decanter, a centrifuge, etc. in liquid. The classification may be carried out after particles have been obtained as powder through drying; nevertheless, it is desirable in terms of efficiency that the classification be carried out in liquid. Unnecessary fine or coarse particles produced may be returned to a kneading process again so as to be used for formation of particles. In this case, the unnecessary fine or coarse particles may be in a wet state.

It is desirable that the dispersant used be removed from the obtained dispersion solution as much as possible and at the same time as the classification.

By mixing the obtained dried toner powder with different particles such as releasing agent fine particles, charge controlling fine particles, fluidizer fine particles and colorant fine particles and mechanically impacting the mixed powder, the different particles are fixed to and fused with the particle surface and thus it is possible to prevent detachment of the different particles from the surface of the composite particles obtained.

As specific method of performing the foregoing, there are a method of impacting the mixture, using a blade which rotates at high speed, and a method of pouring the mixture into a high-speed gas flow, accelerating the speed of the mixture and allowing particles to collide with one another or composite particles to collide with a certain plate. Examples of apparatuses for performing the foregoing include apparatuses in which the pulverization air pressure is reduced, made by modifying I-TYPE MILL (produced by Nippon Pneumatic Mfg. Co., Ltd.) and ANGMILL (produced by Hosokawa Micron Group); HYBRIDIZATION SYSTEM (produced by NARA MACHINERY CO., LTD.); KRYPTRON SYSTEM (produced by Kawasaki Heavy Industries, Ltd.); and automatic mortars.

Examples of the colorant used for the toner include pigments and dyes conventionally used as colorants for toners. Specific examples thereof include carbon black, lamp black, iron black, ultramarine, nigrosine dyes, aniline blue, phthalocyanine blue, phthalocyanine green, Hansa Yellow G, Rhodamine 6C Lake, chalco oil blue, chrome yellow, quinacridone red, benzidine yellow and rose bengal. These may be used alone or in combination.

Further, if necessary, magnetic components may be included alone or in combination in toner particles in order for the toner particles themselves to have magnetic properties. Examples of the magnetic components include iron oxides such as ferrite, magnetite and maghemite, metals such as iron, cobalt and nickel, and alloys composed of these and other metals. Also, these components may be used as or used with colorant components.

Also, the number average particle diameter of the colorant in the toner used in the present invention is preferably 0.5 µm or less, more preferably 0.4 µm or less, even more preferably 0.3 µm or less.

When the number average particle diameter of the colorant in the toner is greater than 0.5 µm, the dispersibility of the pigment is insufficient, and thus favorable transparency cannot be obtained in some cases. When the number average particle diameter of the colorant is less than 0.1 µm, i.e., a minute particle diameter, it is far smaller than the half wavelength of visible light; thus, it is thought that the colorant does not have an adverse effect on light-reflecting and absorbing properties. Therefore, the colorant particles having a number average particle diameter of less than 0.1 µm contribute to favorable color reproducibility and transparency of an OHP sheet with a fixed image. Meanwhile, when there are many colorant particles having a number average particle diameter of greater than 0.5 µm, transmission of incident light is disturbed and/or the incident light is scattered, and thus a projected image on an OHP sheet tends to decrease in brightness and saturation.

Moreover, the presence of many colorant particles which are greater than 0.5 µm in diameter is not preferable because the colorant particles easily detach from the toner particle surface, causing problems such as fogging, smearing of the drum and cleaning failure. It should be particularly noted that colorant particles having a number average particle diameter of greater than 0.7 µm preferably occupy 10% by number or less, more preferably 5% by number or less, of all colorant particles.

By kneading the colorant together with part or all of the binder resin in advance with the addition of a wetting liquid, the colorant and the binder resin are sufficiently attached to each other at an early stage, the colorant is effectively dispersed in toner particles in a subsequent toner production process, the dispersed particle diameter of the colorant becomes small, and thus more excellent transparency can be obtained.

For the binder resin kneaded together with the colorant in advance, any of the resins shown above as examples of the binder resins for the toner can be used without change, but the binder resin is not limited thereto.

As a specific method of kneading a mixture of the colorant and the binder resin in advance with the addition of the wetting liquid, there is, for example, a method in which the colorant, the binder resin and the wetting liquid are mixed together using a blender such as a HENSCHEL MIXER, then the obtained mixture is kneaded at a temperature lower than the melting temperature of the binder resin, using a kneading machine such as a two-roll machine or three-roll machine, and a sample is thus obtained.

For the wetting liquid, those commonly used may be used, in view of the solubility of the binder resin and the wettability thereof with the colorant; water and organic solvents such as acetone, toluene and butanone are preferable in terms of the colorant's dispersibility.

Of these, water is particularly preferably used in terms of the environment care and maintenance of the colorant's dispersion stability in the subsequent toner production process.

With the use of this production method, not only colorant particles contained in the obtained toner are small in diameter, but also the particles are in a highly uniformly dispersed state, so that the color reproducibility of an image projected by an OHP can be further improved.

Additionally, as long as the structure of the present invention is employed, a releasing agent typified by wax may be contained along with the binder resin and the colorant in the toner.

The releasing agent is not particularly limited and may be appropriately selected from those known in the art depending on the intended purpose. Examples thereof include polyolefin waxes such as polyethylene wax, polypropylene wax, etc., long-chain hydrocarbons such as paraffin wax, Sasolwax, etc., and carbonyl group-containing waxes.

Of these, carbonyl group-containing waxes are preferable. Examples the carbonyl group-containing waxes include polyalkanoic acid esters such as carnauba wax, montan wax, trimethylolpropane tribehenate, pentaerythritol tetrabehenate, pentaerythritol diacetate dibehenate, glycerin tribehenate, 1,18-octadecanediol distearate, etc.; polyalkanol esters such as tristearyl trimellitate, distearyl maleate, etc; polyalkanoic acid amides such as ethylenediamine dibehenyl amide, etc.; polyalkylamides such as trimellitic acid tristearyl amide, etc.; and dialkyl ketones such as distearyl ketone, etc.

Of these carbonyl group-containing waxes, preference is given to polyalkanoic acid esters. The melting point of the releasing agent is usually 40° C. to 160° C., preferably 50° C. to 120° C., more preferably 60° C. to 90° C. Waxes having a melting point of lower than 40° C. adversely affect heat-resistant storage ability, and waxes having a melting point of higher than 160° C. are likely to cause cold offset when toner is fixed at a low temperature. The melt viscosity of the releasing agent is preferably 5 cps to 1,000 cps, more preferably 10 cps to 100 cps, when measured at a temperature higher than the melting point by 20° C. The releasing agent having a melt viscosity higher than 1,000 cps are not much effective in improving low-temperature fixing ability and resistance to hot offset. The amount of the releasing agent contained in the toner is preferably 0% by mass to 40% by mass, more preferably 3% by mass to 30% by mass.

Additionally, to adjust the charged amount of the toner and allow toner particles to rise quickly upon charging, a charge controlling agent may be contained in the toner if necessary. Here, when a colored material is used as the charge controlling agent, there is a change in color, so that use of a material which is colorless or whitish is preferable.

As the charge controlling agent is not particularly limited and may be appropriately selected from those known in the art depending on the intended purpose. Examples thereof include triphenylmethane dyes, molybdic acid chelate pigments, rhodamine dyes, alkoxy amines, quaternary ammonium salts (including fluorine-modified quaternary ammonium salts), alkylamides, phosphorus and compounds thereof, tungsten and compounds thereof, fluorine activators, metal salts of salicylic acid and metal salts of salicylic acid derivatives. Specific examples thereof include BONTRON P-51 as a quaternary ammonium salt, E-82 as an oxynaphthoic acid metal complex, E-84 as a salicylic acid metal complex, and E-89 as a phenolic condensate (produced by Orient Chemical Industries); TP-302 and TP-415 as quaternary ammonium salt molybdenum complexes (produced by Hodogaya Chemical Industries); COPY CHARGE PSY VP2038 as a quaternary ammonium salt, COPY BLUE PR as a triphenylmethane derivative, and COPY CHARGE NEG VP2036 and COPY CHARGE NX VP434 as quaternary ammonium salts (produced by Hoechst); LRA-901, and LR-147 as a boron complex (produced by Japan Carlit Co., Ltd.); quinacridone, azo pigments; and polymeric compounds containing functional groups such as sulfonic acid group, carboxyl group and quaternary ammonium salt.

The amount of the charge controlling agent used in the present invention is decided according to the type of the binder resin, the presence or absence of an additive used if necessary, and the toner production method including the dispersing method and so not unequivocally limited; however, the amount is in the range of 0.1 parts by mass to 10 parts by mass, preferably in the range of 0.2 parts by mass to 5 parts by mass, relative to 100 parts by mass of the binder resin. When the amount of the charge controlling agent is greater than 10 parts by mass, the chargeability of the toner is so great that effects of the charge controlling agent are reduced, and there is an increase in electrostatic suction toward a developing roller, causing a decrease in the fluidity of a developer and a decrease in image density. Such a charge controlling agent may be dissolved and dispersed in the toner after melted and kneaded together with a master batch and a resin, or may be directly added into an organic solvent when dissolved and dispersed therein, or may be fixed on the toner particle surface after the formation of toner particles.

When the toner composition is dispersed in the aqueous medium in the toner production process, fine resin particles mainly for stabilizing the dispersion may be added.

For the fine resin particles, any resin may be used as long as it can form an aqueous dispersion. The resin may be a thermoplastic resin or a thermosetting resin. Examples thereof include vinyl resins, polyurethane resins, epoxy resins, polyester resins, polyamide resins, polyimide resins, silicon resins, phenol resins, melamine resins, urea resins, aniline resins, ionomer resins and polycarbonate resins. These may be used alone or in combination. Of these resins, preference is given to vinyl resins, polyurethane resins, epoxy resins, polyester resins, and combinations thereof because an aqueous dispersion of fine spherical resin particles can be easily obtained.

As the vinyl resins, polymers each produced by homopolymerizing or copolymerizing a vinyl monomer are used. Examples thereof include, but not limited to, styrene-(meth) acrylate resins, styrene-butadiene copolymers, (meth)acrylic acid-acrylate copolymers, styrene-acrylonitrile copolymers, styrene-maleic anhydride copolymers and styrene-(meth) acrylate copolymers.

Further, fine inorganic particles are preferably used as an external additive to support the fluidity, developing ability and chargeability of toner particles.

The fine inorganic particles preferably have a primary particle diameter of 0.005 μm to 2 μm each, more preferably 0.005 μm to 0.5 μm each. Also, the fine inorganic particles preferably have a BET specific surface area of 20 $m^2$/g to 500 $m^2$/g. The amount of the fine inorganic particles in the toner is preferably occupy 0.01% by mass to 5% by mass, more preferably 0.01% by mass to 2.0% by mass. Specific examples of the fine inorganic particles include silica, alumina, titanium oxide, barium titanate, magnesium titanate, calcium titanate, strontium titanate, zinc oxide, tin oxide, silica sand, clay, mica, wollastonite, diatom earth, chrome oxide, cerium oxide, red ochre, antimony trioxide, magnesium oxide, zirconium oxide, barium sulfate, barium carbonate, calcium carbonate, silicon carbide and silicon nitride.

Moreover, examples thereof include fine polymer particles exemplified by polymer particles of thermosetting resins, polycondensates such as nylons, benzoguanamine and silicones, acrylic acid ester copolymers, methacrylic acid ester copolymers and polystyrene obtained by soap-free emulsion polymerization, suspension polymerization or dispersion polymerization.

With the use of the fluidizer, the toner particles can be surface treated so as to increase their hydrophobicity, thereby preventing a decrease in the fluidity and chargeability of the toner particles even at high humidity. Suitable examples of the fluidizer include silane coupling agents, silylating agents, fluorinated alkyl group-containing silane coupling agents, organic titanate coupling agents, aluminum coupling agents, silicone oils and modified silicone oils.

Examples of a cleanability enhancer for removing a developer which remains on the photoconductor or the primary transfer medium, after image transfer, include fatty acid metal salts such as zinc stearate, calcium stearate and stearic acid; and fine polymer particles produced by soap-free emulsion polymerization or the like, such as fine polymethyl methacrylate particles and fine polystyrene particles. The fine polymer particles have a relatively narrow particle size distribution, and those which are 0.01 μm to 1 μm in a volume average particle diameter are preferable.

By the use of such toner a high-quality toner image excellent in developing stability can be formed, as described above. However, toner particles which remain on the image bearing member, not having been transferred onto a transfer medium or an intermediate transfer medium by a transfer unit, may possibly pass through a gap between the image bearing member and a cleaning unit because the fineness and superior transferability of the toner particles make it difficult for the cleaning unit to remove them. To remove the toner particles completely from the image bearing member, it is necessary to press a toner removing member such as a cleaning blade against the image bearing member with strong force. Such a load not only shortens the lifetimes of the image bearing member and the cleaning unit but also contributes to consumption of extra energy.

In the case where the load on the image bearing member is reduced, removal of the toner particles and small-diameter carrier particles on the image bearing member is insufficient, and these particles do damage to the surface of the image bearing member when passing through the cleaning unit, and thereby cause variation in the performance of the image forming apparatus.

As described above, since the image forming apparatus of the present invention has wide acceptable ranges with respect to the variation in the state of the image bearing member surface, especially with respect to the existence of a low-resistance site, and has a structure in which the variation in charging performance to the image bearing member is highly reduced. Therefore, the image forming apparatus and the above-mentioned toner are used together so as to obtain significantly high quality images in a stable manner for a long period of time.

Moreover, the image forming apparatus of the present invention can be used with a pulverized toner having an indefinite particle shape as well as with the above-mentioned toner suitable for obtaining high-quality images, and the lifetime of the apparatus can be greatly lengthened.

As the material for such a pulverized toner, any material normally used for electrophotographic toner can be used without any limitation in particular.

Examples of binder resins commonly used for the pulverized toner include, but not limited to, homopolymers of styrene and its substitution polymers, such as polystyrene, poly-p-chlorostyrene and polyvinyl toluene; styrene copolymers such as styrene-p-chlorostyrene copolymers, styrene-propylene copolymers, styrene-vinyl toluene copolymers, styrene-vinyl naphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-α-methyl chlormethacrylate copolymers, styrene-acrylonitrile copolymers, styrene-vinyl methyl ketone copolymers, styrene-butadiene copolymers; styrene-isoprene copolymers and styrene-maleic acid copolymers; homopolymers and copolymers of acrylic acid esters, such as polymethyl acrylate, polybutyl acrylate, polymethyl methacrylate and polybutyl methacrylate; polyvinyl derivatives such as polyvinyl chloride and polyvinyl acetate; polyester polymers, polyurethane polymers, polyamide polymers, polyimide polymers, polyol polymers, epoxy polymers, terpene polymers, aliphatic or alicyclic hydrocarbon resins and aromatic petroleum resins. These may be used alone or in combination. Of these, at least one selected from styrene-acrylic copolymer resins, polyester resins and polyol resins is more preferable in terms of electrical property, cost, and the like. The polyester resins and/or polyol resins are even more preferably used because of their excellent toner-fixing properties.

Additionally, for the above-mentioned reasons, resin component(s) contained in a coating layer of the charging member, which is/are the same as the resin component(s) constituting the binder resin of the toner, is/are preferably at least one selected from linear polyester resin compositions, linear polyol resin compositions, linear styrene-acrylic resin compositions, and cross-linked products thereof.

As to the pulverized toner, for example, the resin component is mixed with the above-mentioned colorant component, wax component and charge controlling component in advance as necessary, then they are kneaded at a temperature lower than or equal to a temperature in the vicinity of the melting temperature of the resin component, and then the mixture is cooled and then subjected to a pulverization and classification process, thereby producing the toner; additionally, the above-mentioned externally added component may be suitably added and mixed therewith if necessary.

(Image Forming Method)

The image forming method of the present invention includes bearing a toner image on the image bearing member, transferring the toner image on the image bearing member to the transfer medium; and applying or adhering the image-bearing member protecting agent onto the surface of the image bearing member, from which the toner image has been transferred onto the transfer medium, so as to form a protective layer, and further includes other know steps. The other known steps are not particularly limited, and those known as the steps of image forming method may be used.

EXAMPLES

Hereinafter, Examples of an image-bearing member protecting agent of the present invention will be specifically described along with Comparative Examples. However, it should be noted that the present invention is not confined to these Examples in any way.

Table 1 shows Examples, in each of which an image-bearing member protecting agent of the present invention is applied onto an image-bearing member, in comparison with Comparative Examples. In the image forming section of the color copier IMAGIO MP C5000 (produced by Ricoh Company, Ltd.) (shown in FIG. 12), a protective layer forming device 2 shown in FIG. 10 was placed in a downstream from a cleaning unit 4, and from the section corresponding to the protective layer forming device 2, each of the image-bearing member protecting agents according to Examples 1 to 5 and Comparative Examples 1 to 4 was supplied to the image-bearing member.

In IMAGIO MP C5000 (produced by Ricoh Company, Ltd.), the technique of JP-A No. 2007-293240 relating to the conventional solid lubricant of zinc stearate was employed in a mechanism for applying pressure on the image-bearing member protecting agent, and the applied pressure was so adjusted as to be substantially constant over time in Examples and Comparative Examples.

The drive condition of the image forming apparatus (color copier) was as follows: a test was carried out in which images were continuously formed on 50,000 sheets of A4 size paper with an image area ratio of 5%, and the consumption of the image-bearing member protecting agent was measured once every 10,000 sheets. The consumption (g/km) was a value obtained by dividing a decrease in mass of the image-bearing member protecting agent by a drive distance of the photoconductor. As the criteria for determination (acceptance) of the consumption of the image-bearing member protecting agent, it had been revealed that the consumption of the image-bearing member protecting agent was preferably 0.1 g/km to 0.3 g/km in IMAGIO MP C5000 (produced by Ricoh Company, Ltd.).

As the image-bearing member protecting agents of Comparative Examples 1 to 4 and Examples 1 to 5, those having the same shape, i.e. a rectangular bar shaped image-bearing member protecting agent block having a certain shape and size: 8 mm height (A)×8 mm width (lateral direction) (B)× 322 mm length in a longitudinal direction (C) shown in FIG. 8, were used. However, the image-bearing member protecting agents differ in the specification of the image-bearing member protecting agent block, namely, a material formulation, production method and density as described below.

As the conditions other than the following specific description, the best conditions described in the above embodiments are applied to all of Comparative Examples 1 to 4 and Examples 1 to 5.

Image-Bearing Member Protecting Agents of Comparative Examples 1 to 4

Comparative Example 1

A fatty acid metal salt was melted, casted in a mold, and then cooled, to thereby mold and obtain an image-bearing member protecting agent. As the fatty acid metal salt, zinc stearate (product of NOF CORPORATION) was used.

All of the image-bearing member protecting agents used in the image forming apparatuses, which are usually used, are produced by the above method.

Comparative Example 2

A fatty acid metal salt was compression molded to obtain an image-bearing member protecting agent having a uniform density from the front surface to the rear surface. As the fatty acid metal salt, zinc stearate (product of NOF CORPORATION) was used.

Comparative Example 3

A fatty acid metal salt and an inorganic lubricant were mixed in a mass ratio of 8:2, melted, casted in a mold, and then cooled, to thereby mold and obtain an image-bearing member protecting agent. As the fatty acid metal salt, zinc stearate (product of NOF CORPORATION) was used, and as the inorganic lubricant, boron nitride (product of Momentive Performance Materials Inc.) was used.

Comparative Example 4

A fatty acid metal salt and an inorganic lubricant were mixed in a mass ratio of 8:2, and compression molded to obtain an image-bearing member protecting agent having a uniform density from the front surface to the rear surface. As the fatty acid metal salt, zinc stearate (product of NOF CORPORATION) was used, and as the inorganic lubricant, boron nitride (product of Momentive Performance Materials Inc.) was used. Image-Bearing Member Protecting Agents of Examples 1 to 3, 4 and 5

Examples 1 to 3

A fatty acid metal salt and an inorganic lubricant were mixed in a mass ratio of 8:2, and compression molded to obtain an image-bearing member protecting agent having a density continuously decreasing from the front surface to the rear surface. As the fatty acid metal salt, zinc stearate (product of NOF CORPORATION) was used, and as the inorganic lubricant, boron nitride (product of Momentive Performance Materials Inc.) was used.

Figure 14:
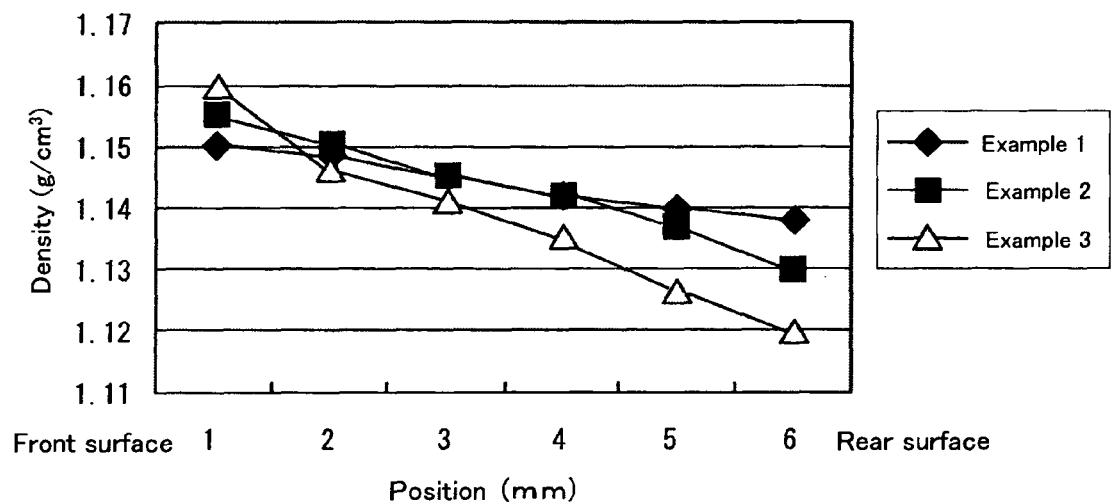
FIG. 14 is a graph showing a relation of a position from the front surface of the image-bearing member protecting agent block and the density at the position in Examples 1 to 3, where the position from the surface of the image-bearing member protecting agent block is taken on a horizontal axis of the graph and the density of the image-bearing member protecting agent block is taken on a vertical axis of the graph.

The image-bearing member protecting agents were formed so that densities thereof were decreased from the front surface to the rear surface respectively by: approximately 1% in Example 1; approximately 2.2% in Example 2, and approximately 3.5% in Example 3 (see FIG. 14).

Example 4

A fatty acid metal salt and an inorganic lubricant were mixed in a mass ratio of 8:2, and compression molded to obtain an image-bearing member protecting agent having a density continuously decreasing from the front surface to the rear surface. As the fatty acid metal salt, calcium stearate (product of Wako Pure Chemical Industries, Ltd.) was used, and as the inorganic lubricant, boron nitride (product of Momentive Performance Materials Inc.) was used.

The image-bearing member protecting agent was formed in the same manner as in Example 1, so that the density of the image-bearing member protecting agent was decreased from the front surface to the rear surface by approximately 1%.

Example 5

A fatty acid metal salt and an inorganic lubricant were mixed in a mass ratio of 8:2, and compression molded to obtain an image-bearing member protecting agent having a density continuously decreasing from the front surface to the rear surface. As the fatty acid metal salt, zinc stearate (product of NOF CORPORATION) was used, and as the inorganic lubricant mica (product of Shiseido Company, Limited) was used.

The image-bearing member protecting agent was formed in the same manner as in Example 1, so that the density of the image-bearing member protecting agent was decreased from the front surface to the rear surface by approximately 1%.

Figure 13:
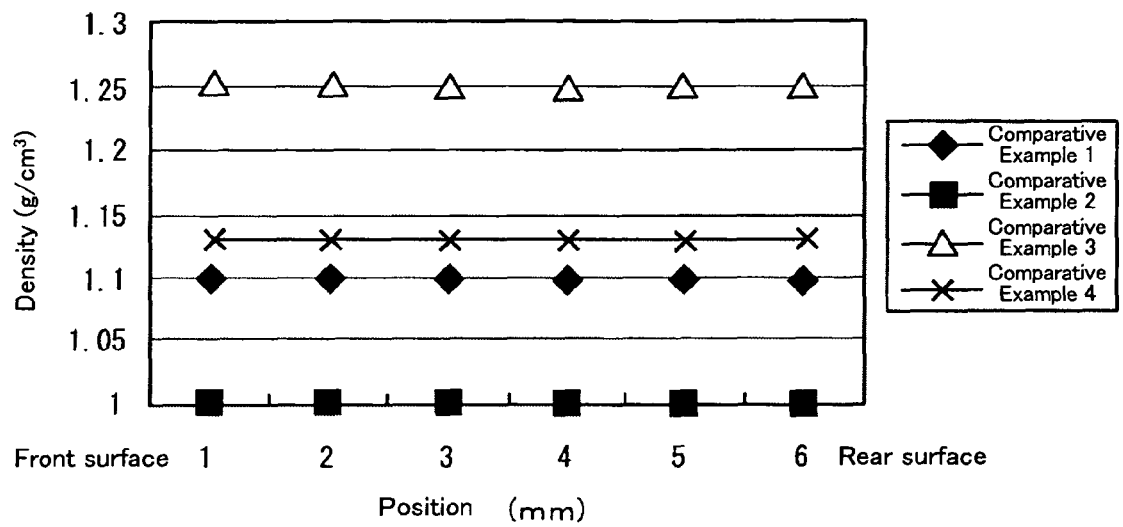
FIG. 13 is a graph showing a relation of a position from the front surface of the image-bearing member protecting agent block and the density at the position in Comparative Examples 1 to 4, where the position from the surface of the image-bearing member protecting agent block is taken on a horizontal axis of the graph and the density of the image-bearing member protecting agent block is taken on a vertical axis of the graph.

FIG. 13 shows each of the densities (g/cm$^3$) of the image-bearing member protecting agent blocks from the front surface to the rear surface of Comparative Examples 1 to 4. FIG. 14 shows each of the densities (g/cm$^3$) of the image-bearing member protecting agent blocks from the front surface to the rear surface of Examples 1 to 3.

Figure 15:
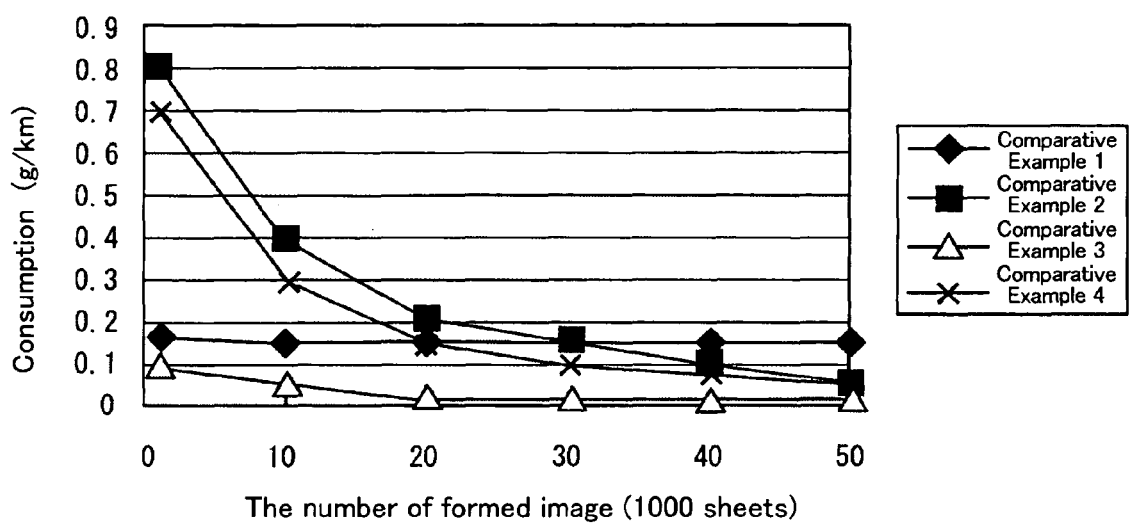
FIG. 15 is a graph showing a relation between the number of formed image and the consumption of the image-bearing member protecting agent block in Comparative Examples 1 to 4, where the number of the formed image in an image formation section in the image forming apparatus is taken on a horizontal axis of the graph and the consumption of the image-bearing member protecting agent block is taken on a vertical axis of the graph.
Figure 16:
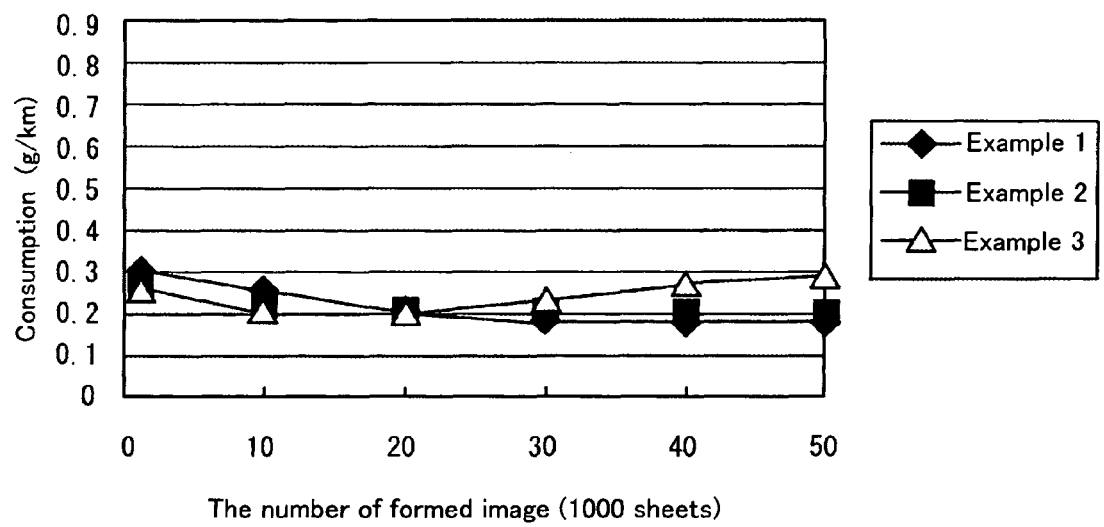
FIG. 16 is a graph showing a relation between the number of formed image and the consumption of the image-bearing member protecting agent block in Examples 1 to 3, where the number of the formed image in the image formation section in the image forming apparatus is taken on a horizontal axis of the graph and the consumption of the image-bearing member protecting agent block is taken on a vertical axis of the graph.

FIG. 15 shows a transition of the consumption of each of the image-bearing member protecting agent blocks in Comparative Examples 1 to 4. FIG. 16 shows a transition of the consumption of each of the image-bearing member protecting agents in Examples 1 to 3.

Even though the solid block shaped image-bearing member protecting agent was formed by mixing and compression molding the fatty acid metal salt and the inorganic lubricant, the image-bearing member protecting agent in Examples was ensured to maintain the consumption at a constant level over time because of the following reasons.

The image-bearing member protecting agent is applied to the electrophotographic image bearing member so as to protect the image bearing member or a surface of the image bearing member from hazard by charging and cleaning. It has been known that the image-bearing member protecting agent is generally applied in such a manner that a solid block shaped image-bearing member protecting agent is scraped off by a brush roller serving as a brush shaped protecting agent supplying member, and the powdered image-bearing member protecting agent is applied to the image bearing member. However, as the brush roller is used for a long period of time, the stiffness of bristles of the brush is decreased, and the force of scraping off the image-bearing member protecting agent block is weakened.

Moreover, the transition of the consumption of the image-bearing member protecting agent block is also significantly influenced by the method for producing the image-bearing member protecting agent. As the difference between Comparative Example 1 and Comparative Example 2 shown in FIG. 15, the image-bearing member protecting agent block formed by being melted and molded can maintain the same consumption over time, while the consumption of the image-bearing member protecting agent block formed by compression molding is significantly decreased with time, even though the same material is used in Comparative Example 1 and Comparative Example 2.

However, as in Comparative Example 3, the image-bearing member protecting agent formed by mixing the fatty acid metal salt and the inorganic lubricant, and then being melted and molded has the remarkably small absolute value of the consumption. This is considered that when the fatty acid metal salt having a melting point is mixed with the inorganic lubricant, the inorganic lubricant serves as a filler, making the image-bearing member protecting agent block too hard. As can be seen in the above-description and from the result of consumption of Examples 1 to 3 shown in FIG. 16, when the fatty acid metal salt and the inorganic lubricant are mixed and molded into the image-bearing member protecting agent and the image-bearing member protecting agent is used, the image-bearing member protecting agent formed by being melted and molded cannot be practically used. Thus, it has been revealed that it is essential to form the image-bearing member protecting agent by compression molding.

However, as to the image-bearing member protecting agent formed by mixing and compression molding the fatty acid metal salt and the inorganic lubricant in Comparative Example 4, the consumption of the image-bearing member protecting agent is decreased with time, and the function of the image-bearing member protecting agent cannot be maintained.

As to these problems, in Examples 1 to 3 as shown in FIG. 14, the density gradient is given to the image-bearing member protecting agent block, so as to prevent the decrease in consumption over time.

As in FIG. 14, the densities of the image-bearing member protecting agents are decreased from the front surface to the rear surface respectively by: approximately 1% in Example 1; approximately 2.2% in Example 2, and approximately 3.5% in Example 3. In view of these and the relation with the consumption in FIG. 16, when the difference in density is 1% to 3.5%, the image-bearing member protecting agent can be used without trouble, with particular preference given to approximately 2.2%.

In Comparative Example 1 and Examples 1, 4 and 5, upon forming images on 50,000 sheets, the results of the degree of the smearing of charging member (charging roller) and smearing of photoconductor are shown in Table 1.

In Table 1, the evaluation results A, B, C and D of smearing of charging member and the smearing of photoconductor are as follows.

<Smearing of Charging Member>
A: The charging member is hardly smeared.
B: The charging member is somewhat smeared but it does not affect images at normal temperature, and it is acceptable.
C: The charging member is smeared to such an extent that images are affected at low temperature.
D: Abnormal images arise at an early stage. The charging member cannot be used.

<Smearing of Photoconductor/Protecting Capability>
A: There is almost no abrasion of the photoconductor and almost no filming.
B: There is slight filming but it is acceptable.
C: Abnormal images arise with time.
D: Abnormal images arise at an early stage. The photoconductor cannot be used.

TABLE 1

|  | Specification of image-bearing member protecting agent block | smearing of charging member | smearing of photoconductor |
|---|---|---|---|
| Comparative Example 1 | melting fatty acid metal salt (zinc stearate) | D | B |
| Example 1 | mixing fatty acid metal salt (zinc stearate) and inorganic lubricant (boron nitride) in a mass ratio of 8:2, and compression molding the mixture (FIGS. 2 to 7) | A | A |
| Example 4 | mixing fatty acid metal salt (calcium stearate) and inorganic lubricant (boron nitride) in a mass ratio of 8:2, and compression molding the mixture (FIGS. 2 to 7) | A | B |

TABLE 1-continued

|  | Specification of image-bearing member protecting agent block | smearing of charging member | smearing of photoconductor |
|---|---|---|---|
| Example 5 | mixing fatty acid metal salt (zinc stearate) and inorganic lubricant (mica) in a mass ratio of 8:2, and compression molding the mixture (FIGS. 2 to 7) | B | A |

As can be seen from the comparison between Example 1 and Example 4, when zinc stearate is used as the fatty acid metal salt, better protecting capability of photoconductor can be obtained. Stearic acid is cheapest among higher fatty acid. Of these, zinc salt is excellent in hydrophobicity and highly stable material.

As can be seen from the comparison between Example 1 and Example 5, when boron nitride is used as the inorganic lubricant, better effect of preventing the charging member from smearing can be obtained.

Since each of the image-bearing member protecting agent of Examples 1 to 5 exhibits protective effect by adhering onto the surface of the image bearing member and then forming a film, it can be relatively plastic deformed. Therefore, when a solid block (lump) shaped image-bearing member protecting agent component is directly pressed to the surface of the image bearing member so as to form a protective layer, the protecting agent is excessively supplied thereto and the protective layer is not efficiently formed. Moreover, the protective layer is formed into a multilayer structure, which may block light transmission in the exposing step for forming a latent electrostatic image. Therefore, the types of the image-bearing member protecting agents to be used are limited. However, the protective layer forming device 2 of the present invention is so structured as in FIG. 10 that the image-bearing member protecting agent 21 is supplied via the supply member to the photoconductor drum 1 as the image bearing member. As a result, the protecting agent can be uniformly supplied to the surface of the image bearing member, even when a soft image-bearing member protecting agent is used.

Moreover, as shown in FIG. 10, when the protective layer forming mechanism 24 as a layer forming member, which presses the image-bearing member protecting agent 21 so as to form a layer, is provided in the protective layer forming device 2, the protective layer forming mechanism 24 may also serve as the cleaning mechanism 4 and/or the cleaning unit 4. To surely form the protective layer, it is preferred that the residue mainly containing toner on the image bearing member be removed beforehand by the cleaning blade 41a as the cleaning unit, so as to prevent the residue from being contained in the protective layer.

According to Examples 1 to 5, the image forming method is performed or image forming apparatus is constituted by using the protective layer forming device 2 having the image-bearing member protecting agent 21, so that the image bearing member can continuously use for a long period of time without being replaced.

Particularly, when the image bearing member contains a thermosetting resin in the outermost layer thereof, the image-bearing member protecting agent 21 can protect the image bearing member from being deteriorated by electrical stress caused by the charging member, and thus the image-bearing member protecting agent allow the image bearing member containing the thermosetting resin to continuously provide long durability against mechanical stress applied thereon. Thus, it is possible to increase the durability of the image bearing member to such a level that the image bearing member can be used, virtually without being replaced.

The charging roller 3 as the charging unit located in contact with or close to the surface of the image bearing member is influenced by larger electrical stress because a discharge region exists extremely close to the image bearing member. However, the image forming apparatus of the present invention, in which a protective layer is formed on the image bearing member can be used without exposing the image bearing member to the electrical stress.

Also, since change in the state of the surface of the image bearing member can be minimized due to the effects of the protective layer formed thereon, it is possible to perform stable cleaning for a long period of time even in the case of using toner of great circularity or toner having a small average particle diameter, in which the quality of cleaning greatly varies depending upon change in the state of the surface of the image bearing member.

According to Examples 1 to 5, by constituting a process cartridge 12 using the protective layer forming device 2 which includes the image-bearing member protecting agent 21, it is possible to greatly lengthen the period of time for which the process cartridge can be used without being replaced. Thus, the running cost is reduced and the amount of waste is greatly reduced.

Particularly, when the image bearing member contains a thermosetting resin in the outermost layer thereof, the image-bearing member protecting agent 21 can protect the image bearing member from being deteriorated by electrical stress, and thus the image-bearing member protecting agent allow the image bearing member containing the thermosetting resin to continuously provide long durability against mechanical stress applied thereon.

Moreover, as described above, the image bearing member protecting component of the present invention contains virtually no metal component, so that the charging unit located in contact with or close to the surface of the image bearing member is not smeared with a metal oxide or the like, and thus the charging unit less changes over time. Therefore, the members constituting the process cartridge 12, such as the image bearing member, the charging member, or the like can easily reuse, and the amount of waste can be further reduced, thereby eventually contributing to the protection of global environment.

What is claimed is:
1. An image-bearing member protecting agent comprising:
a fatty acid metal salt; and
an inorganic lubricant,
wherein the image-bearing member protecting agent is a solid formed by compression molding a particulate or granulated raw material containing the fatty acid metal salt and the inorganic lubricant, and applied or adhered to a surface of an image-bearing member, and
wherein the image-bearing member protecting agent has a front surface which is a side of the image-bearing member protecting agent to be used at the beginning, and a rear surface which is a side thereof to be left when most of the image-bearing member protecting agent has been used, and the image-bearing member protecting agent has a density decreasing from the front surface toward the rear surface by 1% to 3.5%.

2. The image-bearing member protecting agent according to claim 1, wherein the fatty acid metal salt is zinc stearate.

3. The image-bearing member protecting agent according to claim 1, wherein the inorganic lubricant is boron nitride.

4. The image-bearing member protecting agent according to claim 1, wherein the fatty acid metal salt and the inorganic lubricant are mixed in a mass ratio of 8:2.

5. An image forming apparatus comprising:
an image bearing member configured to bear a toner image formed of a toner;
a transfer unit configured to transfer the toner image on the image bearing member to a transfer medium; and
a protective layer forming device configured to apply or adhere an image-bearing member protecting agent to a surface of the image-bearing member, from which the toner image has been transferred onto the transfer medium, so as to form a protective layer,
wherein the image-bearing member protecting agent includes,
a fatty acid metal salt, and
an inorganic lubricant,
wherein the image-bearing member protecting agent is a solid formed by compression molding a particulate or granulated raw material containing the fatty acid metal salt and the inorganic lubricant, and applied or adhered to a surface of an image bearing member, and
wherein the image-bearing member protecting agent has a front surface which is a side of the image-bearing member protecting agent to be used at the beginning, and a rear surface which is a side thereof to be left when most of the image-bearing member protecting agent has been used, and the image-bearing member protecting agent has a density decreasing from the front surface toward the rear surface by 1% to 3.5%.

6. The image forming apparatus according to claim 5, further comprising:
a cleaning unit located downstream from the transfer unit and upstream from the protective layer forming device, with respect to the movement direction of the image bearing member, and configured to rub against the surface of the image bearing member so as to remove the toner remaining thereon.

7. The image forming apparatus according to claim 5, wherein the image bearing member contains a thermosetting resin at least in the outermost layer thereof.

8. The image forming apparatus according to claim 5, the image bearing member is a photoconductor.

9. The image forming apparatus according to claim 5, further comprising a charging unit located in contact with or close to the surface of the image bearing member.

10. The image forming apparatus according to claim 9, wherein the charging unit comprises a voltage applying unit configured to apply a voltage which includes an AC component.

11. The image forming apparatus according to claim 5, wherein the image bearing member is an intermediate transfer medium.

12. The image forming apparatus according to claim 5, wherein the toner has a circularity SR, represented by Equation 1, in the range of 0.93 to 1.00:

Circularity $SR$=Circumferential length of a circle having the same area as projected particle area/Circumferential length of projected particle image    Equation 1.

13. The image forming apparatus according to claim 5, wherein a ratio (D4/D1) of a mass average particle diameter D4 of the toner to a number average particle diameter D1 of the toner is in the range of 1.00 to 1.40.

14. The image forming apparatus according to claim 5, wherein the fatty acid metal salt and the inorganic lubricant are mixed in a mass ratio of 8:2.

15. A process cartridge comprising:
an image bearing member configured to bear a toner image formed of a toner; and
a protective layer forming device configured to apply or adhere an image-bearing member protecting agent to a surface of the image bearing member, from which the toner image has been transferred onto a transfer medium,
wherein the image-bearing member and the protective layer forming device are integrally disposed, and
wherein the image-bearing member protecting agent includes,
a fatty acid metal salt, and
an inorganic lubricant,
wherein the image-bearing member protecting agent is a solid formed by compression molding a particulate or granulated raw material containing the fatty acid metal salt and the inorganic lubricant, and applied or adhered to a surface of an image bearing member, and
wherein the image-bearing member protecting agent has a front surface which is a side of the image-bearing member protecting agent to be used at the beginning, and a rear surface which is a side thereof to be left when most of the image-bearing member protecting agent has been used, and the image-bearing member protecting agent has a density decreasing from the front surface toward the rear surface by 1% to 3.5%.

16. The process cartridge according to claim 15, further comprising:
a cleaning unit located upstream from the protective layer forming device, with respect to a movement direction of the image bearing member, and configured to rub against the surface of the image bearing member so as to remove the toner remaining thereon.

17. The process cartridge according to claim 15, wherein the image bearing member contains a thermosetting resin at least in the outermost layer thereof.

18. The process cartridge according to claim 15, further comprising a charging unit located in contact with or close to the surface of the image bearing member.

19. The process cartridge according to claim 15, further comprising a toner container, which contains the toner having a circularity SR, represented by Equation 1, in the range of 0.93 to 1.00:

Circularity $SR$=Circumferential length of a circle having the same area as projected particle area/Circumferential length of projected particle image    Equation 1.

20. The process cartridge according to claim 15, wherein a ratio (D4/D1) of a mass average particle diameter D4 of the toner to a number average particle diameter D1 of the toner is in the range of 1.00 to 1.40.

21. The process cartridge according to claim 15, wherein the fatty acid metal salt and the inorganic lubricant are mixed in a mass ratio of 8:2.

* * * * *